United States Patent
Sather et al.

(10) Patent No.: US 12,248,880 B2
(45) Date of Patent: *Mar. 11, 2025

(54) USING BATCHES OF TRAINING ITEMS FOR TRAINING A NETWORK

(71) Applicant: Amazon Technologies, Inc., Seattle, WA (US)

(72) Inventors: Eric A. Sather, Palo Alto, CA (US); Steven L. Teig, Menlo Park, CA (US); Andrew C. Mihal, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,507

(22) Filed: Aug. 27, 2023

(65) Prior Publication Data
US 2023/0409918 A1    Dec. 21, 2023

Related U.S. Application Data

(63) Continuation of application No. 17/514,701, filed on Oct. 29, 2021, now Pat. No. 11,741,369, which is a
(Continued)

(51) Int. Cl.
*G06N 3/084* (2023.01)
*G06F 18/21* (2023.01)
(Continued)

(52) U.S. Cl.
CPC ............ *G06N 3/084* (2013.01); *G06F 18/214* (2023.01); *G06F 18/217* (2023.01); *G06N 3/04* (2013.01);
(Continued)

(58) Field of Classification Search
CPC ............ G06N 3/084; G06N 3/04; G06N 3/08; G06N 3/045; G06N 3/048; G06N 7/01;
(Continued)

(56) References Cited

U.S. PATENT DOCUMENTS

| 5,255,347 | A | 10/1993 | Matsuba et al. |
| 5,461,698 | A | 10/1995 | Schwanke et al. |

(Continued)

FOREIGN PATENT DOCUMENTS

WO    2016118402 A1    7/2016

OTHER PUBLICATIONS

Bhavsar, Hetal, et al., "Support Vector Machine Classification using Mahalanobis Distance Function," International Journal of Scientific & Engineering Research, Jan. 2015, 12 pages, vol. 6, No. 1, IJSER.
(Continued)

*Primary Examiner* — Charlotte M Baker
(74) *Attorney, Agent, or Firm* — K&L Gates LLP

(57) ABSTRACT

Some embodiments provide a method for training a machine-trained (MT) network that processes inputs using network parameters. The method propagates a set of input training items through the MT network to generate a set of output values. The set of input training items comprises multiple training items for each of multiple categories. The method identifies multiple training item groupings in the set of input training items. Each grouping includes at least two training items in a first category and at least one training item in a second category. The method calculates a value of a loss function as a summation of individual loss functions for each of the identified training item groupings. The individual loss function for each particular training item grouping is based on the output values for the training items of the grouping. The method trains the network parameters using the calculated loss function value.

20 Claims, 8 Drawing Sheets

Related U.S. Application Data continuation of application No. 16/852,329, filed on Apr. 17, 2020, now Pat. No. 11,163,986, which is a continuation of application No. 15/901,456, filed on Feb. 21, 2018, now Pat. No. 10,671,888.

(60) Provisional application No. 62/599,013, filed on Dec. 14, 2017.

(51) Int. Cl.

| | |
|---|---|
| G06F 18/214 | (2023.01) |
| G06N 3/04 | (2023.01) |
| G06N 3/08 | (2023.01) |
| G06T 7/00 | (2017.01) |
| G06V 10/44 | (2022.01) |
| G06V 10/764 | (2022.01) |
| G06V 10/82 | (2022.01) |
| G06V 40/16 | (2022.01) |

(52) U.S. Cl.
CPC ............... *G06N 3/08* (2013.01); *G06T 7/97* (2017.01); *G06V 10/454* (2022.01); *G06V 10/764* (2022.01); *G06V 10/82* (2022.01); *G06V 40/167* (2022.01); *G06V 40/172* (2022.01); *G06T 2207/20081* (2013.01); *G06T 2207/30201* (2013.01)

(58) Field of Classification Search
CPC ..... G06N 3/047; G06F 18/214; G06F 18/217; G06T 7/97; G06T 2207/20081; G06T 2207/30201; G06V 10/454; G06V 10/764; G06V 10/82; G06V 40/167; G06V 40/172
USPC ......................................................... 382/118
See application file for complete search history.

(56) References Cited

U.S. PATENT DOCUMENTS

| | | | | |
|---|---|---|---|---|
| 8,429,106 | B2* | 4/2013 | Downs | G06N 3/08 706/21 |
| 9,928,448 | B1* | 3/2018 | Merler | G06F 18/2415 |
| 9,928,449 | B2 | 3/2018 | Chavez et al. | |
| 10,019,654 | B1 | 7/2018 | Pisoni | |
| 10,592,732 | B1 | 3/2020 | Sather et al. | |
| 10,671,888 | B1 | 6/2020 | Sather et al. | |
| 11,163,986 | B2 | 11/2021 | Sather et al. | |
| 11,741,369 | B2 | 8/2023 | Sather et al. | |
| 2003/0033263 | A1 | 2/2003 | Cleary | |
| 2011/0282897 | A1 | 11/2011 | Li et al. | |
| 2014/0079297 | A1 | 3/2014 | Tadayon et al. | |
| 2016/0132786 | A1 | 5/2016 | Balan et al. | |
| 2016/0379352 | A1 | 12/2016 | Zhang et al. | |
| 2017/0124385 | A1 | 5/2017 | Ganong et al. | |
| 2017/0161640 | A1 | 6/2017 | Shamir | |
| 2017/0278289 | A1 | 9/2017 | Marino et al. | |
| 2017/0357896 | A1 | 12/2017 | Tsatsin et al. | |
| 2018/0075849 | A1 | 3/2018 | Khoury et al. | |
| 2018/0165554 | A1 | 6/2018 | Zhang et al. | |
| 2018/0232566 | A1 | 8/2018 | Griffin et al. | |
| 2019/0005358 | A1 | 1/2019 | Pisoni | |
| 2019/0065957 | A1 | 2/2019 | Movshovitz-Attias et al. | |
| 2019/0130231 | A1 | 5/2019 | Liu et al. | |
| 2019/0138896 | A1 | 5/2019 | Deng | |
| 2019/0180176 | A1* | 6/2019 | Yudanov | G06N 3/08 |
| 2019/0258925 | A1* | 8/2019 | Li | G06F 16/583 |
| 2019/0279046 | A1* | 9/2019 | Han | G06F 18/24 |
| 2019/0362233 | A1 | 11/2019 | Aizawa et al. | |
| 2020/0250476 | A1 | 8/2020 | Sather et al. | |
| 2022/0051002 | A1 | 2/2022 | Sather et al. | |

OTHER PUBLICATIONS

Chung, Eric, et al., "Accelerating Persistent Neural Networks at Datacenter Scale," HC29: Hot Chips: A Symposium on High Performance Chips 2017, Aug. 20-22, 2017, 52 pages, IEEE, Cupertino, CA, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

He, Qin, "Neural Network and Its Application in IR," Month Unknown 1999, 31 pages.

Hermans, Alexander, et al., "In Defense of the Triplet Loss for Person Re-Identification," Nov. 21, 2017, 17 pages, retrieved from https://arxiv.org/abs/1703.07737.

Huang, Gao, et al., "Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.

Jain, Anil K., et al., "Artificial Neural Networks: A Tutorial," Computer, Mar. 1996, 14 pages, vol. 29, Issue 3, IEEE.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Karresand, Martin, et al., "File Type Identification of Data Fragments by Their Binary Structure," Proceedings of the 2006 IEEE Workshop on Information Assurance, Jun. 21-23, 2006, 8 pages, IEEE, West Point, NY, USA.

Keller, Michel, et al., "Learning Deep Descriptors with Scale-Aware Triplet Networks," 2018 IEEE/CVF Conference on Computer Vision and Pattern Recognition, Jun. 18-23, 2018, 9 pages, IEEE, Salt Lake City, UT, USA.

Kohrs, Arnd, et al., "Improving Collaborative Filtering with Multimedia Indexing Techniques to Create User-Adapting Web Sites," Proceedings of the Seventh ACM International Conference on Multimedia (Part 1), Oct. 1999, 10 pages, ACM.

Li, Hong-Xing, et al., "Interpolation Functions of Feedforward Neural Networks," Computers & Mathematics with Applications, Dec. 2003, 14 pages, vol. 46, Issue 12, Elsevier Ltd.

Liu, Yishu, et al., "Scene Classification via Triplet Networks," IEEE Journal of Selected Topics in Applied Earth Observations and Remote Sensing, Jan. 2018, 18 pages, vol. 11, No. 1, IEEE.

Mandelbaum, Amit et al., "Distance-based Confidence Score for Neural Network Classifiers," Sep. 28, 2017, 10 pages, arXiv:1709.09844v1, Computer Research Repository (CoRR), Cornell University, Ithaca, NY, USA.

Nguyen, Bac, et al., "Supervised Distance Metric Learning Through Maximization of the Jeffrey Divergence," Pattern Recognition, Nov. 16, 2016, 11 pages, vol. 64, Elsevier Ltd.

Qian, Qi, et al., Efficient Distance Metric Learning by Adaptive Sampling and Mini-Batch Stochastic Gradient Descent (SGD), Machine Learning, Month Unknown 2015, 20 pages, Springer.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Schroff, Florian, et al., "FaceNet: A Unified Embedding for Face Recognition and Clustering," Proceedings of 2015 IEEE Conference on Computer Vision and Pattern Recognition (CVPR 2015), Jun. 7-12, 2015, 9 pages, IEEE, Boston, MA, USA.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.

(56) References Cited

OTHER PUBLICATIONS

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Urtasun, R., "Lecture 9: Support Vector Machines," CSC2515 Fall 2015 Introduction to Machine Learning, Month Unknown 2015, 25 pages.

Wang, Zilei, et al., "Linear Distance Coding for Image Classification," IEEE Transactions on Image Processing, Feb. 2013, 12 pages, vol. 22, No. 2, IEEE.

Worfolk, Patrick, et al., "ULP DNN Processing Unit Market Opportunity," Month Unknown 2017, 40 pages, Synaptics Incorporated, San Jose, CA, USA.

Xiang, Shiming, et al., "Learning a Mahalanobis distance metric for data clustering and classification," Pattern Recognition, Dec. 1, 2008, 13 pages, vol. 41, No. 12, Elsevier Ltd.

Yang, Liu, "Distance Metric Learning: A Comprehensive Survey," May 19, 2006, 51 pages.

Zhang, Dongqing, et al., "LQ-Nets: Learned Quantization for Highly Accurate and Compact Deep Neural Networks," Jul. 26, 2018, 21 pages, arXiv: 1807.10029v1, Computer Research Repository (CoRR)—Cornell University, Ithaca, NY, USA.

Zhao, Bin, et al., "Maximum Margin Clustering with Multivariate Loss Function," 2009 Ninth IEEE International Conference on Data Mining, Dec. 6-9, 2009, 10 pages, IEEE, Miami Beach, FL.

Zheng, Wei-Shi, et al., "Person Re-identification by Probabilistic Relative Distance Comparison," 2011 Proceedings of CVPR—IEEE Computer Society Conference on Computer Vision and Pattern Recognition, Jun. 2011, 8 pages, IEEE, Colorado Springs, CO, USA.

Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.

Zhu, Chenzhuo, et al., "Trained Ternary Quantization," Dec. 4, 2016, 9 pages, arXiv: 1612.01064v1, Computing Research Repository (CoRR)—Cornell University, Ithaca, NY, USA.

* cited by examiner

USING BATCHES OF TRAINING ITEMS FOR TRAINING A NETWORK

CLAIM OF BENEFIT TO PRIOR APPLICATIONS

This application is a continuation application of U.S. patent application Ser. No. 17/514,701, filed Oct. 29, 2021, now published as U.S. Patent Publication 2022/0051002. U.S. patent application Ser. No. 17/514,701 is a continuation application of U.S. patent application Ser. No. 16/852,329, filed Apr. 17, 2020, now issued as U.S. Pat. No. 11,163,986. U.S. patent application Ser. No. 16/852,329 is a continuation application of U.S. patent application Ser. No. 15/901,456, filed Feb. 21, 2018, now issued as U.S. Pat. No. 10,671,888. U.S. patent application Ser. No. 15/901,456 claims the benefit of U.S. Provisional Patent Application 62/599,013, filed Dec. 14, 2017. U.S. patent application Ser. No. 17/514,701, now published as U.S. Patent Publication 2022/0051002, U.S. patent application Ser. No. 16/852,329, now issued as U.S. Pat. No. 11,163,986, and U.S. patent application Ser. No. 15/901,456, now issued as U.S. Pat. No. 10,671,888, are incorporated herein by reference.

BACKGROUND

An important use of neural networks is for recognizing objects and/or faces in images. One technique often used in training networks for face recognition is to send three images (an anchor image of a first face, a positive image of the same face, and a negative image of a different face) and use these results to improve the network. However, this can be a time-consuming and resource-expensive process, and thus improved techniques are needed to both improve the resultant face-recognition network and speed up the training process.

BRIEF SUMMARY

Some embodiments use techniques for training a machine-trained network (e.g., to perform image categorization or face-recognition) using groupings of training items, that increases test accuracy and decreases training time. Some embodiments use large batches of training items, with multiple training items per category, in order to achieve a number of training item groupings that increases superlinearly as a function of the number of training items propagated through the network. For instance, rather than propagating through the network a single set of three training items with (i) an anchor training item, (ii) a positive training item of the same category as the anchor, and (iii) a negative training item of a different category than the anchor, some embodiments propagate multiple training items for each of multiple categories (e.g., faces of multiple people) through the network to generate output values for each of the training items, and construct as many triplets (or other groupings) as possible with these training items. In constructing the groupings, each training item can act as an anchor, a positive, or a negative in numerous different groupings. The output values of these training items are used to calculate the loss function used for training the network in some embodiments.

Different embodiments use different types of training items (e.g., images, audio samples, video, text-based documents, etc.), and different groupings of training items (e.g., an anchor with multiple positive training items and multiple negative training items). For the purposes of discussion herein, the use of images (e.g., for face recognition, object categorization, etc.) and triplet groupings (i.e., one anchor image, one positive image, and one negative image) will be primarily discussed.

To construct all of the possible triplets for a set of images with $N_p$ categories and $N_I$ images per category, some embodiments use each image as an anchor image and construct all of the triplets for that anchor image. For each of $N_p*N_I$ anchor images, there are $(N_I-1)$ positive images and $N_I*(N_p-1)$ negative images, and the total number of triplets that are constructed is the multiple of these three values. This is a value of the order $N_I^3*N_p^2$. In other cases, the number of images is not constant per category, and in this case different numbers of triplets can be generated for the loss function calculation.

As having more triplets enables better training of the network, using these larger batches of images provides more training per resources consumed. Processing one image (e.g., a 1920×1080 pixel image) through the network to generate an output value (e.g., a 128-dimensional vector) takes substantially more computing resources than computing a loss function using three such output values. As such, the more loss function calculations per image sent through the network, the better use of resources for training (within a reasonable limit). In addition, randomly selecting groups of images will often lead to comparisons that are not useful for training, especially in the latter iterations of training. That is, in many comparisons the negative image is very different from the anchor and positive images, so the triplet does not provide useful data for training. By enumerating all possible triplets, the loss function is guaranteed to include calculations based on the most informative triplets.

To compute the loss function used for training (e.g., via backpropagation), some embodiments use a summation of a triplet-based loss function. That is, some embodiments calculate a loss function for each triplet, and sum this over all possible triplets. Different embodiments may use different triplet loss functions. For example, some embodiments use a thresholded loss function that measures the difference between the distance from the positive vector to the anchor vector and the distance from the negative vector to the anchor vector (but set to 0 if the anchor vector is closer to the positive vector than to the negative vector).

Some embodiments (either for single triplets or for large structured batches of images yielding numerous triplets) use a loss function that is based on the probability of misclassification. Such a loss function of some embodiments does not have a sharp cut-off and thus always attempts to further improve the margin. In some embodiments, the probabilistic loss function is a Boltzmann-based loss function that is based on the assumption that for each category, the output vectors are distributed according to a normal distribution (with the same variance for each category). The loss function of some embodiments is given as the logarithm (e.g., the natural logarithm) of the inverse of the probability that the anchor image is classified in the same category as the positive image rather than the same category for the third image. Decreasing the projection of the anchor onto the vector from the positive output vector to the negative output vector reduces the loss function. Furthermore, unlike with a simple thresholded distance-based loss function, the derivative of the probabilistic loss function is always negative as the projection of the anchor output vector onto the vector from the positive output vector to the negative output vector decreases (i.e., as the anchor output vector moves closer to the positive output vector and further from the negative output vector). As such, the loss function of some embodiments will always further train the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
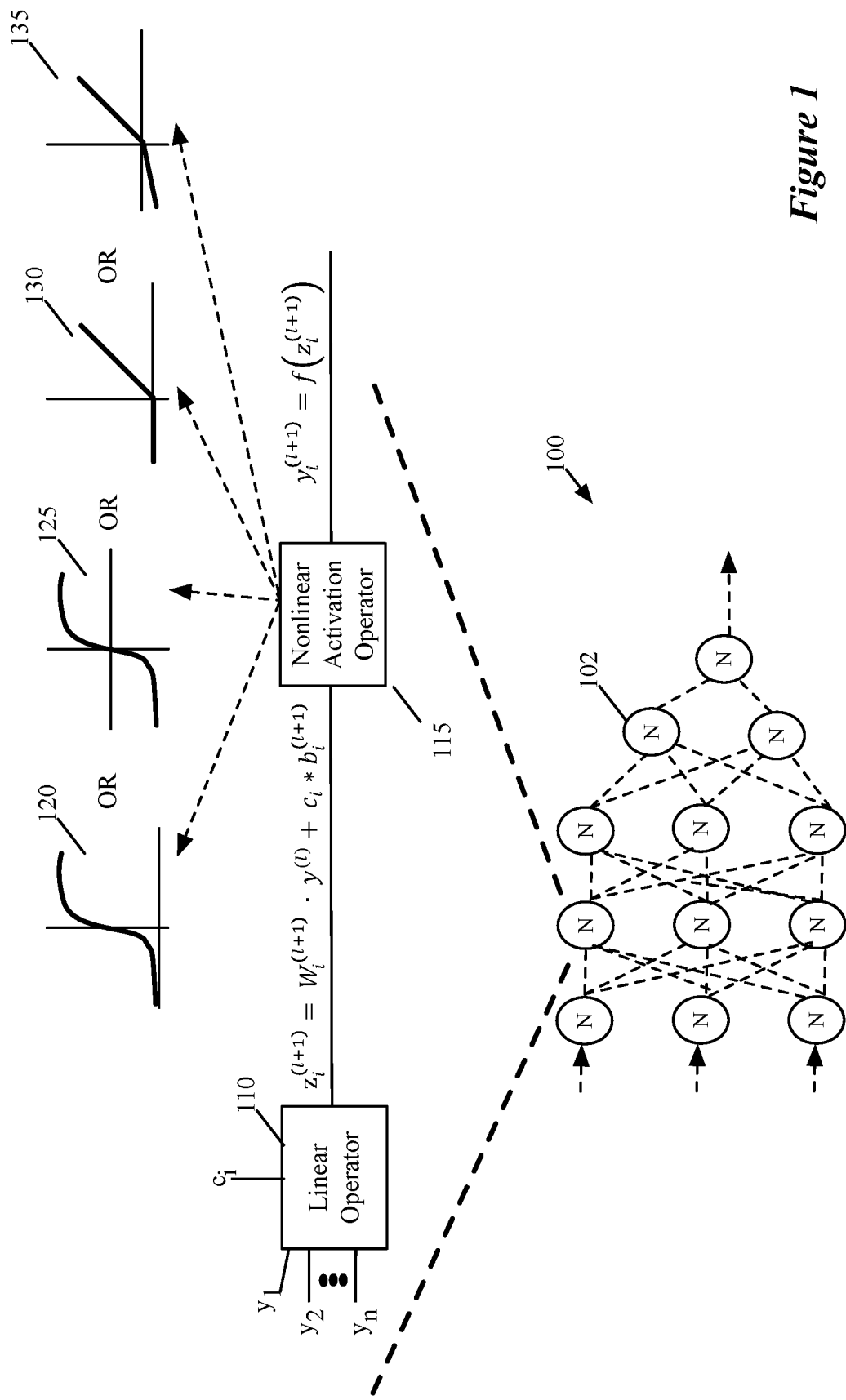
FIG. 1 illustrates an example of a multi-layer machine-trained network of some embodiments.

Some embodiments use techniques for training a machine-trained network (e.g., to perform image categorization or face-recognition) using groupings of training items, that increases test accuracy and decreases training time. Some embodiments use large batches of training items, with multiple training items per category, in order to achieve a number of training item groupings that increases super-linearly as a function of the number of training items propagated through the network. For instance, rather than propagating through the network a single set of three training items with (i) an anchor training item, (ii) a positive training item of the same category as the anchor, and (iii) a negative training item of a different category than the anchor, some embodiments propagate multiple training items for each of multiple categories (e.g., faces of multiple people) through the network to generate output values for each of the training items, and construct as many triplets (or other groupings) as possible with these training items. In constructing the groupings, each training item can act as an anchor, a positive, or a negative in numerous different groupings. The output values of these training items are used to calculate the loss function used for training the network in some embodiments.

Different embodiments use different types of training items (e.g., images, audio samples, video, text-based documents, etc.), and different groupings of training items (e.g., an anchor with multiple positive training items and multiple negative training items). For the purposes of discussion herein, the use of images (e.g., for face recognition, object categorization, etc.) and triplet groupings (i.e., one anchor image, one positive image, and one negative image) will be primarily discussed.

To construct all of the possible triplets for a set of images with $N_p$ categories and $N_I$ images per category, some embodiments use each image as an anchor image and construct all of the triplets for that anchor image. For each of $N_p*N_I$ anchor images, there are $(N_I-1)$ positive images and $N_I*(N_p-1)$ negative images, and the total number of triplets that are constructed is the multiple of these three values. This is a value of the order $N_I^3*N_p^2$. In other cases, the number of images is not constant per category, and in this case different numbers of triplets can be generated for the loss function calculation.

As having more triplets enables better training of the network, using these larger batches of images provides more training per resources consumed. Processing one image (e.g., a 1920×1080 pixel image) through the network to generate an output value (e.g., a 128-dimensional vector) takes substantially more computing resources than computing a loss function using three such output values. As such, the more loss function calculations per image sent through the network, the better use of resources for training (within a reasonable limit). In addition, randomly selecting groups of images will often lead to comparisons that are not useful for training, especially in the latter iterations of training. That is, in many comparisons the negative image is very different from the anchor and positive images, so the triplet does not provide useful data for training. By enumerating all possible triplets, the loss function is guaranteed to include calculations based on the most informative triplets.

To compute the loss function used for training (e.g., via backpropagation), some embodiments use a summation of a triplet-based loss function. That is, some embodiments calculate a loss function for each triplet, and sum this over all possible triplets. Different embodiments may use different triplet loss functions. For example, some embodiments use a thresholded loss function that measures the difference between the distance from the positive vector to the anchor vector and the distance from the negative vector to the anchor vector (but set to 0 if the anchor vector is closer to the positive vector than to the negative vector).

Some embodiments (either for single triplets or for large structured batches of images yielding numerous triplets) use a loss function that is based on the probability of misclassification. Such a loss function of some embodiments does not have a sharp cut-off and thus always attempts to further improve the margin. In some embodiments, the probabilistic loss function is a Boltzmann-based loss function that is based on the assumption that for each category, the output vectors are distributed according to a normal distribution (with the same variance for each category). The loss function of some embodiments is given as the logarithm (e.g., the natural logarithm) of the inverse of the probability that the anchor image is classified in the same category as the positive image rather than the same category for the third image. Decreasing the projection of the anchor onto the vector from the positive output vector to the negative output vector reduces the loss function. Furthermore, unlike with a simple thresholded distance-based loss function, the derivative of the probabilistic loss function is always negative as the projection of the anchor output vector onto the vector from the positive output vector to the negative output vector decreases (i.e., as the anchor output vector moves closer to the positive output vector and further from the negative output vector). As such, the loss function of some embodiments will always further train the network.

The above description introduces the use of structured groups of triplets and a probabilistic triplet loss function. Several more detailed embodiments are described below. First, Section I describes the use and training of machine-trained networks generally. Next, Section II describes in further detail the structuring of groups of images for more efficient triplet training, and Section III describes the probabilistic loss function of some embodiments and how to efficiently compute this loss function and its derivatives. Section IV then describes the incorporation of a machine-trained network into a device. Finally, Section V describes an electronic system with which some embodiments of the invention are implemented.

I. Neural Networks

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In some embodiments, the output of the network 100 is a number in a range of values (e.g., 0 to 1). In some embodiments, the output is a vector representing a point in an N-dimensional space (e.g., a 128-dimensional vector). In other embodiments, the output of the network 100 is a number representing one of a predefined set of categories (e.g., for a network that classifies each input into one of eight possible outputs, the output could be a three-bit value). In this example, the neural network 100 only has one output node. Other neural networks of other embodiments have several output nodes that provide more than one output value. In addition, the neural networks of other embodiments may be types of networks other than feed forward networks (e.g., recurrent networks, etc.).

As shown in FIG. 1, each node in neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous stage node that the linear operator receives) plus an offset. Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer/plus an offset that is computed as a constant value $c_i$ times a weight value $b_i$, typically referred to as a bias:

$$z_i^{(l+1)} = (W_i^{(l+1)} \cdot y(O)) * c_i + b_i^{(l+1)} = \Sigma_{K=1}^{n}(w_i^{(l+1)} * y^{(l)}) * c_i + b_i^{(l+1)} \quad (A)$$

The constant value $c_i$ is a value to which all the weight values are normalized. In some embodiments, the constant value $c_i$ is 1. The symbol * is an element-wise product, while the symbol • is the dot product. The weight coefficients WO are parameters that can be adjusted during the network's training in order to configure this network to solve a particular problem.

The output $y^{(l+1)}$ of the nonlinear component 115 of a node in layer l+1 is a function of the node's linear component, and can be expressed as by Equation (B) below:

$$y_i^{(l+1)} = f(z_i^{(l+1)}) \quad (B)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C).

$$y_i^{(l+1)} = f(z_i^{(l+1)}) = f[(\Sigma_{k=1}^{n} w_{ik} * yk) * c_i + b_i^{(l+1)}] \quad (C)$$

In this equation, $w_{ik}$ are weight values associated with the inputs yk of the node i in layer l+1.

In some embodiments, the neural network is a convolutional feed-forward neural network. In this case, the intermediate layers (referred to as "hidden" layers) may include convolutional layers, pooling layers, fully-connected layers, and normalization layers. The convolutional layers of some embodiments use a small kernel (e.g., 5 pixels×5 pixels) to process each tile of pixels in an image with the same set of parameters. Pooling layers combine the outputs of clusters of nodes from one layer into a single node at the next layer, as part of the process of reducing an image (which may have a large number of pixels) down to a single output (e.g., a vector output).

Before a multi-layer network can be used to solve a particular problem, the network has to be put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set, and then (2) backpropagates a gradient (rate of change) of a loss function (output error) that quantifies in a particular way the difference between the input set's known output value set and the input set's computed output value set, in order to adjust the network's configurable parameters (e.g., the weight coefficients). As mentioned, some embodiments use a triplet-based loss function that probabilistically computes the error based on three images (two of which are the same category, and one of which is a different category than the other two).

II. Constructing Triplets with Batches of Images

As mentioned, some embodiments train the machine-trained network using a loss function based on the output values for triplets of images. In various embodiments, the network is trained to perform image analysis operations such as image categorization (identifying which of several types of objects are present in an image) or face recognition. For training, triplets of images are used that each include (i) an anchor image, (ii) a positive image of the same category as the anchor, and (iii) a negative image of a different category than the anchor. These categories could be cat and dog, or first and second people's faces. For an accurate network, the output value for the anchor image should be closer to the output value for the positive image than to the output value for the negative image.

In order to increase test accuracy and decrease training time, some embodiments train the network using large batches of images, with multiple images per category. This results in a number of triplets that increases superlinearly as a function of the number of images propagated through the network. That is, rather than propagating through the network a single triplet, some embodiments propagate multiple images for each of multiple categories (e.g., faces of multiple people) through the network to generate output values for each of the images, and construct as many triplets as possible with these images. In constructing the triplets, each image can act as all three types of image (anchor/positive/negative) in numerous different triplets. The output values of these triplets are used to calculate the loss function used for training the network in some embodiments.

Figure 2:
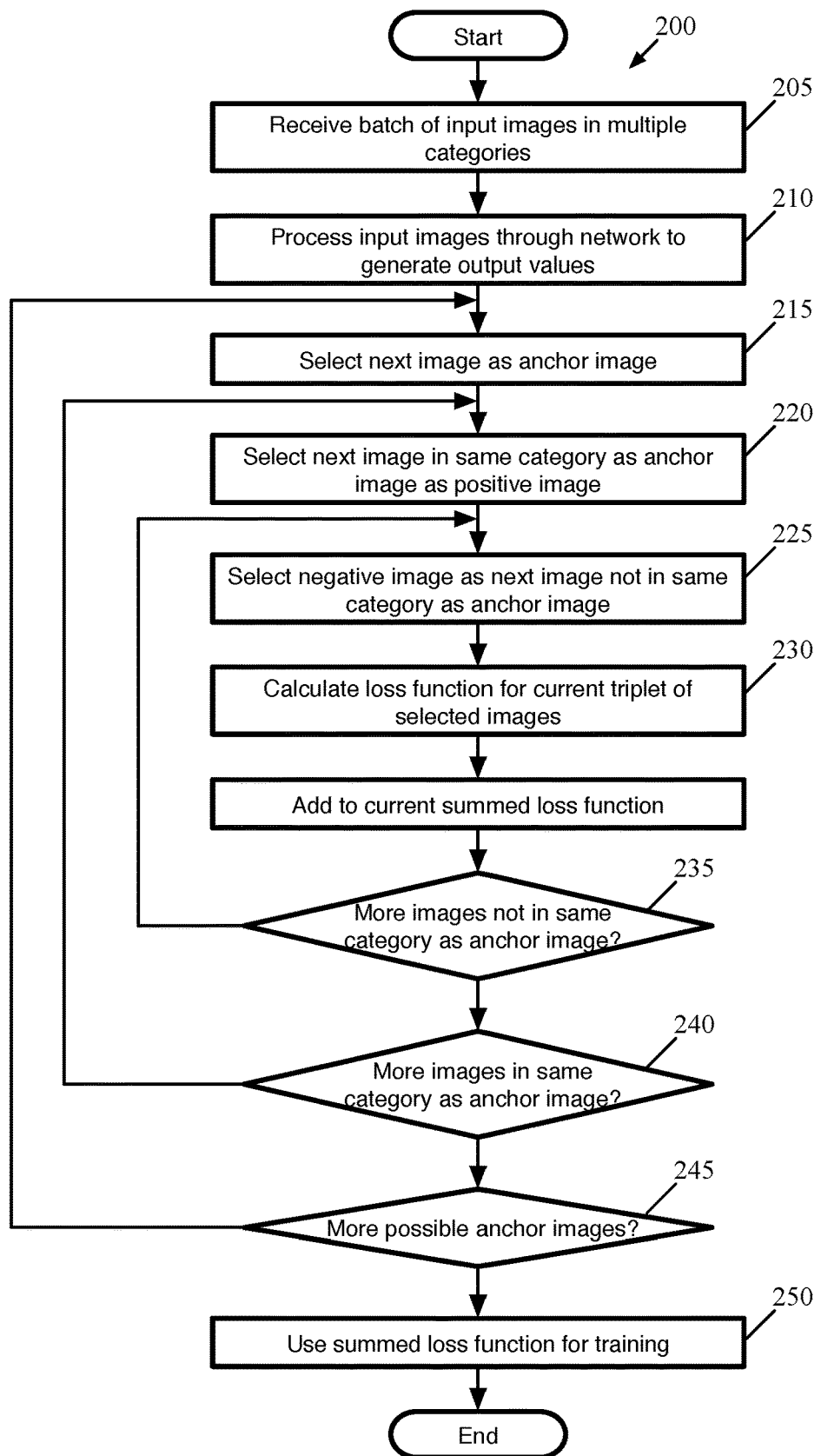
FIG. 2 conceptually illustrates a process of some embodiments for training a network using a batch of images to calculate a triplet-based loss function.

FIG. 2 conceptually illustrates a process 200 of some embodiments for training a network using a batch of images to calculate a triplet-based loss function. The process 200 may be performed by a single training machine (e.g., a virtual machine, a bare metal computer, etc.) or a cluster of such machines. In some embodiments, the process uses graphics processing unit (GPU) resources to perform some or all of the operations. The process 200 will be described in part by reference to FIG. 3, which conceptually illustrates construction of a group of triplets based on a batch of six images of three people's faces (two images per person).

As shown, the process 200 begins by receiving (at 205) a batch of input images grouped into multiple categories that the network is being trained to recognize. As noted, these categories may be different objects (i.e., images of cats, dogs, rabbits, apes, and other animals) or different people's faces (i.e., multiple images of each of several people). In the latter case, the network of some embodiments is trained to recognize when two images are the same person's face, or when a new image matches the face of a specific target face (e.g., for identification via facial recognition).

Figure 3:
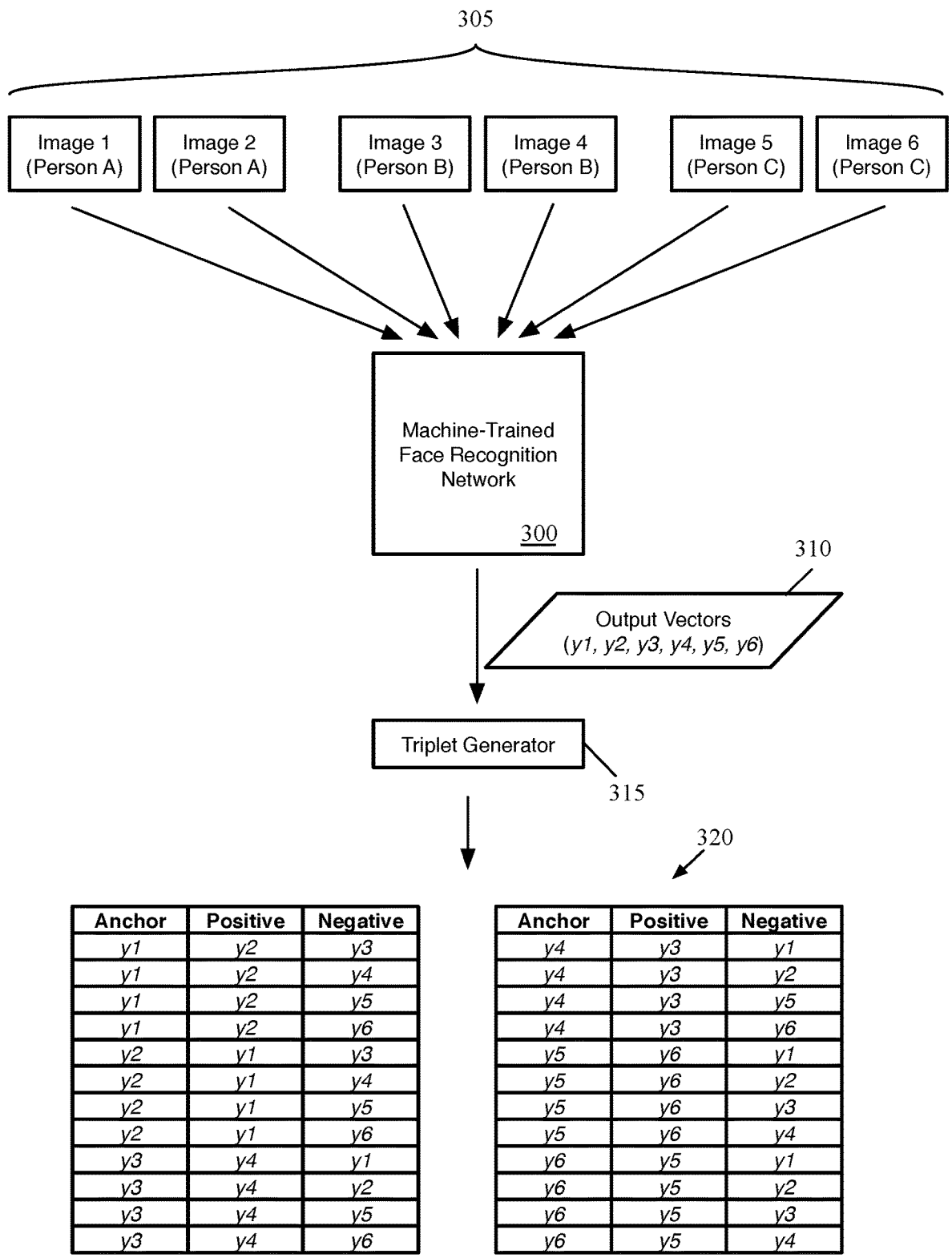
FIG. 3 conceptually illustrates a set of six images used to train a face recognition network.

FIG. 3 conceptually illustrates a set of six images 305 used to train a face recognition network 300. This set of images 305 includes two images of the face of Person A (Images 1 and 2), two images of the face of Person B (Images 3 and 4), and two images of the face of Person C (Images 5 and 6). It should be understood that in many cases, more than three different categories and more than two images per category will be used for training (e.g., 10 people, with 10 images per face).

Next, the process 200 processes (at 210) the input images through the network to generate output values. In some embodiments, these are vectors in N-dimensional space (e.g., 128-dimensional vectors). For an optimally-trained network, the output vectors for images in the same category (e.g., all cat images, or all images of a particular person's face) should all be nearer to each other in the N-dimensional space than to the output vectors for images in different categories. In some embodiments, the output vectors for images in a particular category are assumed to be distributed in an N-dimensional normal distribution, as described further below in Section III. In FIG. 3, the face recognition network processes each of the six images 305 to generate six output vectors 310 ($y_1$, $y_2$, $y_3$, $y_4$, $y_5$, and $y_6$). Output vector $y_1$ is the output vector for Image 1, output vector $y_2$ is the output vector for Image 2, etc.

The process 200 then constructs the triplets used to calculate the loss function for training the network. To construct all of the possible triplets for a set of images, some embodiments use each image as an anchor image and construct all of the triplets for that anchor image. The operations 215-225 and 240-250 illustrate this triplet construction process in detail. To construct a triplet, the process 200 selects (at 215) a next image as the anchor image for the next set of triplets. As each of the images will be the anchor image for a set of triplets, any of the images may be selected initially, and subsequently any image that has not yet served as the anchor image may be selected. Next, the process selects (at 220), as the positive image for the current triplet, a next image in the same category as the anchor image. Each image in this category (other than the anchor image itself) may be selected initially, and subsequently any image that has not yet served as the positive image for the current anchor image may be selected. Lastly, the process selects (at 225), as the negative image for the current triplet, a next image that is not in the same category as the anchor image. Each image in any of the other categories (i.e., categories other than that of the anchor image) can be selected as a negative image for the anchor.

Next, with the current triplet constructed, the process 200 calculates (at 230) the loss function for the current triplet of selected images. This loss function may be a probabilistic loss function such as that described below in Section III, a thresholded distance-based loss function (e.g., that measures whether the distance from the anchor image output vector to the positive image output vector is less than the distance from the anchor image output vector to the negative image output vector), or a different loss function using the output vectors for the triplet.

The process 200 also adds (at 235) the loss function for the current triplet to a summed loss function for the batch of training images. The loss function of some embodiments used for backpropagation is a sum over the triplet-based loss function for all possible triplets. It should be understood that the process 200 is a conceptual process, and the order in which a training system performs the specific operations may vary for different embodiments. For example, some embodiments construct and store all image triplets at once, then calculate the loss functions for each of these triplets from the output vectors. In addition, as described further below, some embodiments calculate and cache certain computations used repeatedly in the loss function calculations (e.g., the squared distances between each pair of image output vectors), so as to avoid performing the same calculations repeatedly for different triplets that use the same images.

The process 200 next determines (at 240) whether additional images remain that are not in the same category as the anchor image. If additional such images remain, the process returns to 225 to select the next such image as the negative image for a new triplet (using the same anchor and positive images as for the previous triplet). Once all of the possible negative images have been used to construct triplets for the current positive and anchor images, the process 200 determines (at 245) whether additional images remain in the same category as the anchor image. If additional such images remain, the process returns to 220 to select the next such image as the positive image for a new set of triplets (using the same anchor image as for the previous triplets). Once all of the images in the same category as the anchor image have been used to construct triplets for the current anchor image, the process 200 determines (at 250) whether additional images remain that have not been used as anchor images. If additional images remain, the process returns to 215 to select the next anchor image and construct its triplets.

Once all of the images have been used as anchor images, the process uses (at 255) the summed loss function for training of the network. In some embodiments, this training uses backpropagation to determine partial gradients of the loss function with respect to each network parameter at the current value of the summed loss function, and modifies the network parameters according to these gradients.

Assuming each category has a same number of images in a training batch, then there are $N_P$ categories and $N_I$ images per category. For each of $N_P*N_I$ anchor images, there are ($N_I$−1) positive images and $N_I*(N_P$−1) negative images, and the total number of triplets $N_T$ that are constructed is the multiple of these three values. This is a value of the order $N_I^3*N_P^2$, as shown by the below equation:

$$N_T = (N_I N_P)*(N_I-1)*(N_I(N_P-1)) = N_P N_I^2(N_I N_P + 1 - (N_I + N_P)) \quad (D)$$

FIG. 3, as noted, illustrates two images ($N_I$=2) for each of three people ($N_P$=3). The triplet generator 315 identifies all of the triplets for the output vectors 310, yielding 6*1*4=24 total triplets (four triplets for each anchor image), as shown by the chart 320. In other cases, the number of images is not constant per category, and in this case different numbers of triplets can be generated for the loss function calculation.

As having more triplets enables better training of the network, using these larger batches of images provides more training per resources consumed. Processing one image (e.g., a 1920×1080 pixel image) through the network to generate an output value (e.g., a 128-dimensional vector) takes substantially more computing resources than computing a loss function using three such output values (especially when some of the loss function computations can be reused between triplets. As such, the more loss function calculations per image sent through the network, the better use of resources for training (within a reasonable limit).

Figure 4:
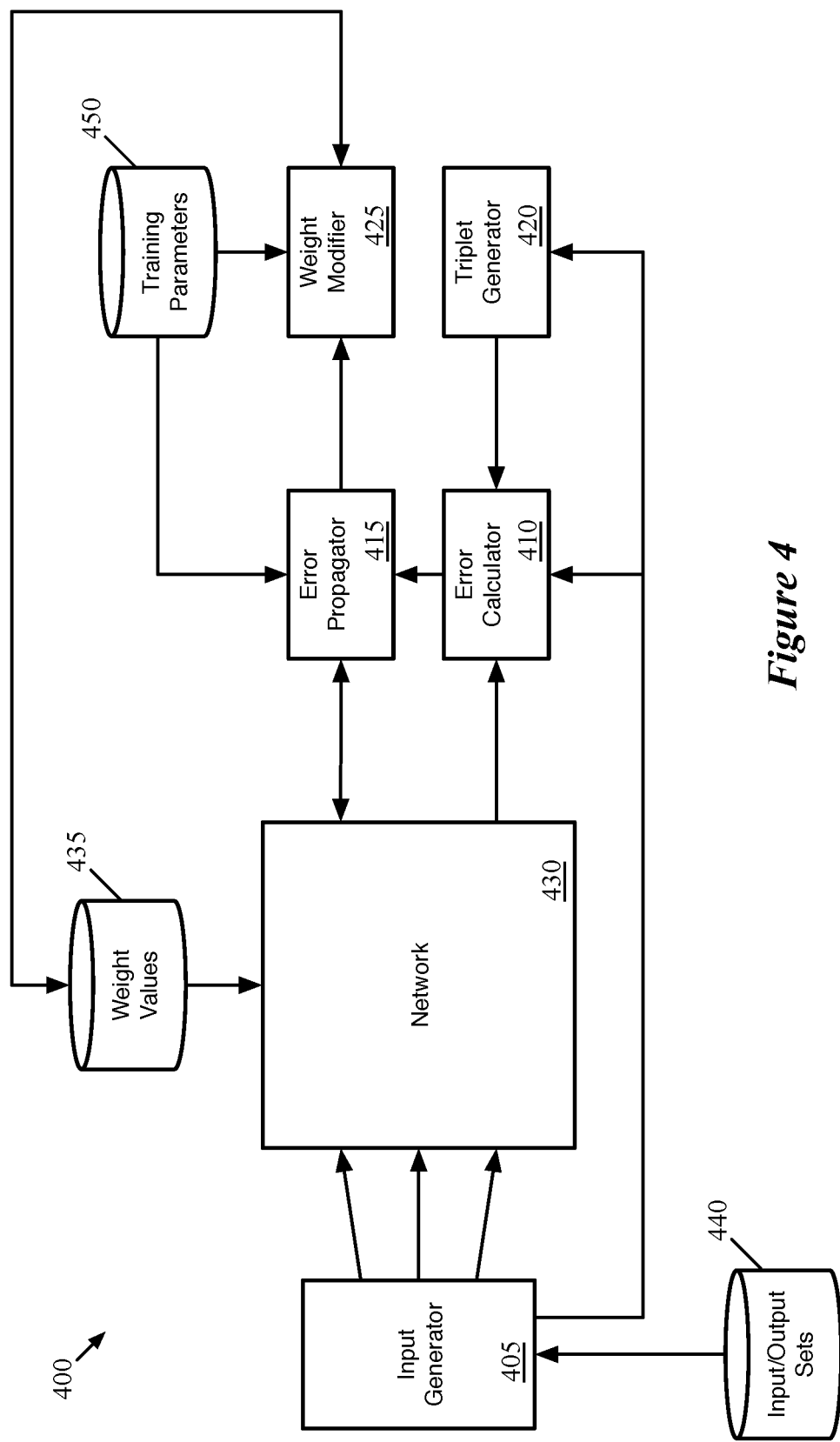
FIG. 4 conceptually illustrates a training system of some embodiments that uses structured groups of input images to calculate a loss function as a summation over individual triplet-based loss functions for numerous triplets constructed from the input images.

FIG. 4 conceptually illustrates a training system 400 of some embodiments that uses structured groups of input images to calculate a loss function as a summation over individual triplet-based loss functions for numerous triplets constructed from the input images, in order to train a network 430 to perform a particular purpose (e.g., face recognition). As shown, the system 400 includes an input generator 405, an error calculator 410, an error propagator 415, a triplet generator 420, and a weight modifier 425. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power).

The network 430 of some embodiments is a multi-layer machine-trained network (e.g., a feed-forward neural network), such as that shown in FIG. 1. It includes multiple layers of nodes, including a layer of input nodes, at least one layer of hidden nodes, and a layer of output nodes. Each hidden node and output node includes a linear component (that uses the weight values 435) and a non-linear activation function. The network 430 receives inputs (e.g., images) and generates a corresponding output. It should be noted that while the description herein relates to a network that processes images for facial recognition or other categorization problems, similar processes may be adapted to other types of neural networks, and that the training system 400 of some embodiments is also for training other types of networks.

The weight values 435 are used to parametrize the network, and are trained by the system 400 for the network to perform a particular task (e.g., facial recognition). In some embodiments, these weights are initialized using a probabilistic distribution for each layer. That is, in some embodiments, the weights within each layer are selected randomly from a Gaussian distribution.

For the inputs, some embodiments perform training with a large number of different inputs, as this can help train the weight values for an average input. Each input in an input set may be an image, a voice snippet, etc. that is to be propagated through the network, depending on the specific purpose for which the network is being trained. For example, for a face recognition network, the inputs will include numerous images of various different faces (with multiple images for each face). Similarly, for a network being trained to identify specific objects in images, the training set will include numerous images for each types of object. The inputs will often include various types of edge cases (e.g., images in which a face is distorted, where objects partially appear in front of the face, etc.).

The input generator 405 selects a set of inputs (and corresponding outputs or ground truth data) from the sets of inputs and outputs 440. In addition, in some embodiments, the input generator 405 breaks up the inputs into constituent values to be fed into the input layer of the network 430. For instance, for a network being trained for face recognition, the input generator might simply divide the pixels into several sections (e.g., a convolutional network kernel), or might perform computations based on the pixel values and feed these to the input layer (e.g., the percentage of red pixels in the image, the average red value of each pixel, or other statistics). That is, based on the input (e.g., an image), the input generator 405 might perform a set of computations in order to generate the inputs for the input layer of the network 430.

The network 430 then processes the set of inputs through the network to generate outputs according to the state of the network 430 (and weight values 435). Each input propagates through the processing nodes of the network 430, with each layer of nodes receiving their one or more inputs and generating a set of outputs to pass to the next layer of nodes. In the final output layer, one or more nodes receives the outputs from the previous layer and generates the outputs of the network. In some embodiments, for each node, the linear component first computes a weighted sum of its input values (according to the current weight values 435) and then the non-linear activation function computes an output based on this weighted sum.

The triplet generator 420 receives the inputs and ground truth data (i.e., identifying the category for each input image) and generates all of the possible triplets for this data (e.g., as shown in FIG. 3). These triplets are provided to the error calculator 410, in order for the error calculator 410 to calculate the loss function for each triplet. The error calculator 410 then computes the error for the input set (i.e., the loss function). As mentioned, some embodiments use a probabilistic loss function that identifies the probability of the anchor image being misclassified as the same category as the negative image rather than the positive image. The probabilistic loss function of some embodiments is described in greater detail below in Section III.

With the loss function calculated, the error calculator 410 provides this loss function result to the error propagator 415, which backpropagates the loss function to determine the rate of change of the loss function with respect to a change of each weight value. In typical training, the loss function is backpropagated through the network in a process that determines, for each weight, the rate of change of the loss function with respect to a change in the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network. In some embodiments, the error propagator 415 first determines the partial derivatives with respect to each dimension of each of the output vectors, then further backpropagates these derivatives through the nodes of the network 430.

Based on the relative rates of change and a training factor, the weight modifier 425 adjusts the weight values. That is, the error propagator 415 provides, for each weight value $w_{ik}$, the partial derivative of the loss function with respect to that $w_{ik}$. These partial derivatives are used to update the weight values by moving the weight values in the direction opposite the gradient (to attempt to reduce the loss function value) by a particular amount, with a larger partial derivative for a particular weight (i.e., a component of the gradient) resulting in a greater change to that weight. The weight modifier 425 uses a training rate factor from the training parameters 450 to determine how much to change the weight values based on the instantaneous gradient components. That is, the gradient component for a particular weight provides an amount to move (in the direction opposite to the gradient component, as the goal is to minimize the loss function) that weight value relative to the other weight values, while the training rate specifies the distance of that move. Specifically, for each weight value $w_{ik}$, with a learning rate r, the weight modifier updates this weight value using the following equation.

$$w_{ik(updated)} = w_{ik} - \left(r * \frac{\partial L}{\partial w_{ik}}\right) \quad \text{(E)}$$

Some embodiments perform the training process repeatedly (using additional batches of images or the same batches of images) until a set of criteria for stopping is reached. Some embodiments use a minimization process (e.g., a stochastic gradient descent minimizer) to determine when to stop training the network. In some embodiments, the system 400 only stops training the network once all of the weights have changed by less than a threshold for a particular number of training iterations. In some embodiments, the input generator determines whether to perform more training; in other embodiments, a different module (e.g., a module not shown in FIG. 4) makes this determination. Once the system 400 determines that no more training is required, the system stores the current weight values for the network. This network can then be embedded in a device so as to perform the desired process (face recognition, etc.) for new inputs.

III. Probabilistic Triplet Loss Function

As discussed above, a triplet of images includes an anchor image (A), a positive image (P), and a negative image (N), and the network of some embodiments produces D-dimensional output vectors $y_A$, $y_P$, and $y_N$ for these images that are inputs to the loss function. Generally, the positive and anchor vectors should match (or be close), while the negative and anchor vectors should be different from each other. The probabilistic loss function of some embodiments assumes that the output vectors for images of a given face (or other type of category) are described by a D-dimensional normal distribution:

$$y(i,p) \sim N(\mu(p), \sigma^2), \quad \text{(F)}$$

where $\mu(p)$ is the D-dimensional mean for person p and $\sigma^2$ is the variance, assumed to be the same for all output dimensions and all people. This is the maximum-entropy distribution for the given mean and variance. Considering two images for a given person, then the output vectors for the images are both distributed according to the normal distribution above, and the difference of the two vectors is distributed according to a D-dimensional normal distribution with mean 0 and twice the variance:

$$y(i_1,p) - y(i_2,p) \sim N(0, 2\sigma^2)$$

As mentioned, given a triplet, the anchor image is "classified" as either the person in the positive image (true category) or the person in the negative image (false category). The Boltzmann loss function for classifying the anchor using this triplet of images is:

$$\begin{aligned}
l(y_A, y_P, y_N) &= \log \frac{1}{P_{true}(A, P, N)} \quad \text{(G)} \\
&= -\log \frac{N(y_A - Y_P \mid 0, 2\sigma^2)}{N(y_A - y_P \mid 0, 2\sigma^2) + N(y_A - y_N \mid 0, 2\sigma^2)}, \\
&= \log\left\{1 + e^{\left[\frac{(y_A - y_P)^2 - (y_A - y_N)^2}{4\sigma^2}\right]}\right\} \\
&= \log\left\{1 + e^{\left[\frac{(y_A - 0.5(y_N + y_P))(y_N - y_P)}{2\sigma^2}\right]}\right\}
\end{aligned}$$

wherein log represents the natural logarithm in some embodiments.

From Equation (G), it can be seen that to reduce the loss, the projection of the anchor onto the vector from $y_P$ to $y_N$ should be decreased. The derivatives of the triplet loss function are:

$$\frac{\partial l(y_A, y_P, y_N)}{\partial y_A(d)} = t(y_A, y_P, y_N)[(y_A(d) - y_P(d)) - (y_A(d) - y_N(d))] \quad (H)$$

$$= t(y_A, y_P, y_N)(y_N(d) - y_P(d))$$

$$\frac{\partial l(y_A, y_P, y_N)}{\partial y_P(d)} = t(y_A, y_P, y_N)(y_P(d) - y_A(d)) \quad (I)$$

$$\frac{\partial l(y_A, y_P, y_N)}{\partial y_N(d)} = t(y_A, y_P, y_N)(y_A(d) - y_N(d)) \quad (J)$$

In these equations (H)-(J), y(d) is the $d^{th}$ component of vector y and $t(y_A, y_P, y_N)$ is a common coefficient for the derivative for triplet $(y_A, y_P, y_N)$, given as:

$$t(y_A, y_P, y_N) = \frac{1}{(2\sigma^2)\{1 + e^{[s(y_A,y_N) - s(y_A,y_P)]}\}} \quad (K)$$

In equation (K), $s(y_1, y_2)$ is the square of the distance from $y_1$ to $y_2$ measured in units of $2\sigma^2$:

$$s(y_1, y_2) = \frac{(y_1 - y_2)^2}{4\sigma^2} \quad (L)$$

For two images of the same person $s(y_1, y_2)$ has expectation value ½.

Each of the three derivatives of the loss function (H)-(J) corresponds to a directed edge of the triangle with vertices $y_A$, $y_P$, and $y_N$, and the sum of the derivatives is zero. This is a consequence of the translation invariance of the loss function. As such, the net force exerted by the triplet loss function is zero. The anchor output vector is pushed away from the negative output vector and pulled toward the positive output vector, the positive output vector is pulled toward the anchor output vector, and the negative output vector is pushed away from the anchor output vector.

The loss gradient for the anchor is thus given by:

$$\frac{\partial l(y_A, y_P, y_N)}{\partial y_A(d)} = \frac{y_N(d) - y_P(d)}{1 + e^{\left[-\frac{(y_A - \frac{1}{2}(y_N + y_P))(y_N - y_P)}{2\sigma^2}\right]}} \quad (M)$$

Given fixed positive and negative output vectors, the gradient force on the anchor increases monotonically as the anchor moves in the direction $y_N - y_P$, toward the negative and away from the positive. Thus, the gradient force is strongest for the worst misclassifications (i.e., when the anchor output vector is closest to the negative output vector and furthest from the positive output vector in D-dimensional space).

As described above, in a structured batch of input images of some embodiments, there are $N_p$ people each with $N_i$ images. The overall loss function of some embodiments is the sum of the losses of all triplets composed of images in the batch:

$$l = \Sigma_{triplets(A,P,N)} l(y_A, y_P, y_N) \quad (N)$$

A. Efficient Computation of Loss and Derivatives

When computing numerous individual triplet loss functions, efficiency in calculation becomes important. The following presents the algorithms of some embodiments in pseudocode. First, Algorithm 1 caches the squared distances for all pairs of images with complexity $O(N_p^2 N_i^2 D)$.

| Algorithm 1 Compute Squared Lengths |
| --- |
| 1:     function SQUAREDLENGTHS |
| 2:       for each unique pair of images $(p_1, i_1) < (p_2, i_2)$ do |
| 3:         $a \leftarrow [y(p_1, i_1) - y(p_2, i_2)]^2/(4\sigma^2)$ |
| 4:         $s(y(p_1, i_1), y(p_2, i_2)) \leftarrow a$ |
| 5:         $s(y(p_2, i_2), y(p_1, i_1)) \leftarrow a$ |
| 6:       end for |
| 7:     end function |

Next, Algorithm 2 computes the loss function (in forward propagation) for all triplets, with complexity $O(N_p^2 N_i^3)$. As can be seen, this algorithm selects an anchor image and cycles through each possible positive image for that anchor image, and within each positive image selection, cycles through each possible negative image for that anchor/positive combination.

| Algorithm 2 Compute Loss Function |
| --- |
| 1:   function COMPUTELOSS |
| 2:     $l \leftarrow 0$ |
| 3:     for each anchor image $(p_A, i_A)$ do |
| 4:       for each positive image $(p_A, i_P), i_P \neq i_A$ do |
| 5:         for each negative image $(p_N, i_N), p_N \neq p_A$ do |
| 6:           $l \mathrel{+}= \log\{1 + e^{[s(y_A, y_P) - s(y_A, y_N)]}\}$ |
| 7:         end for |
| 8:       end for |
| 9:     end for |
| 10:   end function |

When computing the derivative of the loss function in backward propagation, the coefficients $c(p_1, i_1; p_2, i_2)$ of vector differences that appear in the derivative are first computed according to the equation:

$$\frac{\partial l}{\partial y(p_1, i_1, d)} = \sum_{(p_2, i_2)} c(p_1, i_1; p_2, i_2)[y(p_2, i_2, d) - y(p_1, i_1, d)] \quad (O)$$

This is computed as shown in Algorithm 3, which has complexity $O(N_p^2 N_i^3)$.

| Algorithm 3 Compute Derivative Coefficients |
| --- |
| 1:   function COMPUTEDERIVATIVECOEFFICIENTS |
| 2:     for each image $(p_1, i_1)$ do |
| 3:       for each image $(p_2, i_2)$ do |
| 4:         $c(p_1, i_1; p_2, i_2) \leftarrow 0$ |
| 5:       end for |
| 6:     end for |
| 7:     for each anchor image $(p_A, i_A)$ do |
| 8:       for each positive image $(p_A, i_P), i_P \neq i_A$ do |
| 9:         for each negative image $(p_N, i_N), p_N \neq p_A$ do |
| 10:           $t \leftarrow 1/\{(2\sigma^2)[1 + e^{(s(y_A, y_N) - s(y_A, y_P))}]\}$ |
| 11:           $c(p_A, i_A; p_N, i_N) \mathrel{+}= t$ |
| 12:           $c(p_A, i_A; p_A, i_P) \mathrel{-}= t$ |
| 13:           $c(p_A, i_P; p_A, i_A) \mathrel{-}= t$ |
| 14:           $c(p_N, i_N; p_A, i_A) \mathrel{+}= t$ |
| 15:         end for |
| 16:       end for |
| 17:     end for |
| 18:   end function |

Finally, the derivative of the loss function, which has complexity $O(N_p^2 N_i^2 D)$, is computed using Algorithm 4:

---
Algorithm 4 Compute Derivatives
---
1: function LOSS DERIVATIVES
2:   for each image $(p_1, i_1)$ do
3:     $\partial l/\partial y(p_i, i_1) \leftarrow 0$
4:     for each image $(p_2, i_2)$ do
5:       for each $d \in [0, D-1]$ do
6:         $\partial l/\partial y\,(p_1, i_1, d) \mathrel{+}= c(p_1, i_1; p_2, i_2)[y(p_2, i_2, d) - y(p_1, i_1, d)]$
7:       end for
8:     end for
9:   end for
10: end function

---

Another approach is to compute the coefficients of vectors $y(p_2, i_2)$ rather than vector differences $[y(p_2, i_2, d) - y(p_1, i_1, d)]$, as this would enable avoiding the computation of the vector differences. However, this would risk loss of significance due to "catastrophic cancellation" (computing the difference of two large but nearly equal terms).

The overall complexity of these calculations is $O(N_p^2 N_i^2 (D+N_i))$. By accumulating the contributions to each coefficient $c(p_1, i_1; p_2, i_2)$ before summing the vector differences in the derivative, a higher complexity of $O(N_{triplet} D) = O(N_p^2 N_i^3 D)$ is avoided.

B. Extropy

Some embodiments push harder on the triplets with the greatest risk of misclassification using a log-sum-exponent (LSE) formulation of the loss function, referred to as extropy:

$$l_{extropy} = a \log \Sigma_{triplets(A,P,N)} e^{l(y_A, y_P, y_N)/a} \qquad (P)$$

The concept of extropy, which seeks to correct worst-case error rather than focusing on average error, is described in greater detail in U.S. patent application Ser. No. 15/825,030, which is incorporated herein by reference. In the above Equation (P), the smoothing factor $\alpha$ is measured in bits. The derivative of the extropy loss function is given by:

$$\frac{\partial l_{extropy}}{\partial l(y_A, y_P, y_N)} = \frac{e^{l(y_A, y_P, y_N)/a}}{\sum_{triplets} (A, P, N) e^{l(y_A, y_P, y_N)/a}} \qquad (Q)$$

In order to avoid overflow/underflow when computing the LSE in the extropy loss function, some embodiments use the upper bound on $l(y_A, y_P, y_N)$ of $\log(1 + e^{(s_{max-pos} - s_{min-neg})})$ in forward propagation. In backward propagation, some embodiments use the maximum triplet loss found during forward propagation.

C. Dynamic Variance

For each category of image (e.g., person) p in a group of images, the centroid, $\mu(p)$, is the average of the vectors for all images in that category:

$$\mu(p, d) = \frac{1}{N_i - 1} \sum_i y(p, i) \qquad (R)$$

As noted above, some embodiments assume equal variance for all categories and all output dimensions. In some such embodiments, this variance is estimated as the following:

$$\sigma^2 = \frac{1}{N_p} \sum_p \frac{1}{N_i - 1} \sum_i \frac{1}{D} \sum_d [y(p, i, d) - \mu(p, d)]^2 \qquad (S)$$

The loss derivatives described above treat the variance as a constant, under the assumption that it is slowly varying and updated periodically. Some embodiments treat the variance as dynamic, with additional derivative terms computed as follows:

$$\frac{\partial l(y_A, y_P, y_N)}{\partial \sigma^2} = -2t(y_A, y_P, y_N)[s(y_A, y_P) - s(y_A, y_P)] \qquad (T)$$

$$\frac{\partial \sigma^2}{\partial y(p, i, d)} = \frac{2[y(p, i, d) - \mu(p, d)]}{N_p(N_i - 1)D} \qquad (U)$$

This leads to an extra contribution to $\partial l/\partial y(p, i, d)$ given by:

$$\frac{\partial l}{\partial \sigma^2} \frac{\partial \sigma^2}{\partial y(p, i, d)} = -\frac{4A[y(p, i, d) - \mu(p, d)]}{N_p(N_i - 1)D}. \qquad (V)$$

In the above equation (V), A is given by the following:

$$A \equiv \sum_{triplets(A,P,N)} t(y_A, y_P, y_N)[s(y_A, y_P) - s(y_A, y_N)] \qquad (W)$$

$$= \frac{1}{2\sigma^2} \sum_{triplets(A,P,N)} \frac{s(y_A, y_P) - s(y_A, y_N)}{1 + e^{[s(y_A, y_P) - s(y_A, y_N)]}}$$

$$= \frac{1}{2\sigma^2} \sum_{triplets(A,P,N)} P_{true}(A, P, N)[s(y_A, y_P) - s(y_A, y_N)]$$

$$= \frac{1}{2\sigma^2} \sum_{triplets(A,P,N)} P_{true}(A, P, N) \log \frac{P_{true}(A, P, N)}{P_{false}(A, P, N)}$$

Here, if A>0 then every image has an additional gradient force pushing its output vector away from its centroid. If A<0 then every image has an additional gradient force pulling its output vector towards its centroid. One special case of A<0 occurs when every triplet is correctly classified ($p_{true}(A, P, N) > P_{false}(A, P, N)$).

It should be noted that most of the computational work required to compute these extra terms goes into computing the factor A, which is not specific to the output vector with respect to which the differentiation is performed (and thus can be cached and reused). The additional terms in the derivative can be computed with a complexity of $O(N_{triplet} + N_p N_i D) = O(N_p N_i (N_p N_i^2 + D))$.

D. Computation of Loss and Derivatives in GPU

In some embodiments, a graphics processing unit (GPU) of a computing device performs the computations described herein. The following describes techniques for the GPU of some embodiments to perform these computations, once the images in a batch have been processed through the network and the output vectors for all of these images stored.

1. Squared Lengths Matrix

Some embodiments define in the GPU a matrix of squared lengths used to compute the loss function (i.e., the squared lengths of Algorithm 1 above). The squared lengths matrix s is symmetrical and the diagonal is zero. In some embodiments, the GPU computes each element in the strictly upper triangular section in parallel, and each GPU thread writes its result to the two symmetric output elements. Some embodiments create $N_p N_i (N_p N_i - 1)/2$ threads indexed in row-major order on the strictly upper triangular part of the matrix. The following provides an example matrix:

$$\begin{bmatrix} . & 0 & 1 & 2 & 3 \\ . & . & 4 & 5 & 6 \\ . & . & . & 7 & 8 \\ . & . & . & . & 9 \\ . & . & . & . & . \end{bmatrix}$$

A function UpperTriToRowCol converts this thread indexing scheme to normal row and column indices, as shown in Algorithm 5:

---
Algorithm 5 Parallel Squared Lengths
---
1: function UpperTriToRowCol (x)
2:     $d \leftarrow N_p N_i$
3:     $\text{row} \leftarrow d - 2 - \left\lfloor \frac{(\sqrt{-8x + 4d(d-1) - 7})}{2} - \frac{1}{2} \right\rfloor$
4:     col ← x + row + 1 − d(d − 1)/2 + (d − x)((d − x) − 1)/2
5:     return (row; col)
6: end function
7: function SQUAREDLENGTHSGPU
8:     for all x ∈ [0, $N_p N_i (N_p N_i - 1)$] do in parallel
9:       (row; col) ← UPPERTRITOROWCOL (x)
10:      a ← ∥ y(row) − y(col) $\|^2/(4\sigma^2)$
11:      s(row; col) ← a
12:      s(col; row) ← a
13:     end for
14: end function
---

2. Loss Function

Figure 5:
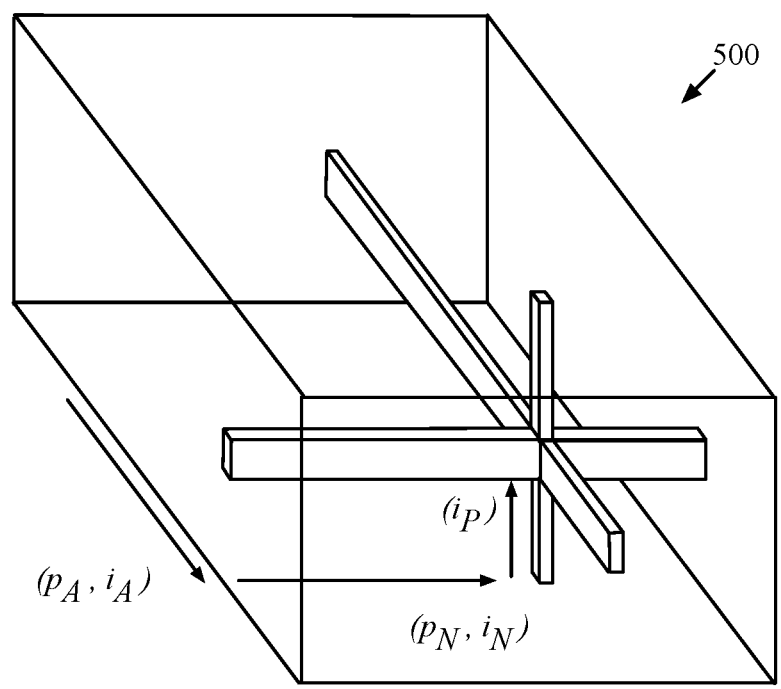
FIG. 5 illustrates a matrix with one entry for each triplet that is used to store loss components.

To compute the loss function on the GPU, some embodiments compute each per-triplet loss component given in equation (N) in parallel and then perform a reduction sum. A matrix with one entry for each triplet is needed to store the loss components, as shown in FIG. 5. Assuming that there are an equal number of images for each category, the matrix 500 has $N_p N_i$ rows and $N_p N_i$ columns for the ($p_A$, $i_A$) anchor images and ($p_N$, $i_N$) negative images respectively, and $N_i$ layers in the third dimension for the positive images ($p_A$, $i_P$). Entries in the triplet matrix where $p_A = p_N$ or $i_A = i_P$ represent invalid triplets (i.e., the anchor and the positive may not be the same image, and the anchor and negative images cannot be from the same category). Instead of using a complex indexing scheme to only compute the matrix entries for proper triplets, some embodiments create a GPU thread for every triplet matrix entry and compute zero when $p_A = p_N$ or $i_A = i_P$.

The overall loss function is computed as shown below in Algorithm 6. In some embodiments, this computation uses the function Log 1PExp(x) to compute $\log(1+e^{(x)})$ accurately. This function comes from Dr. Martin Machler at ETH Zurich, who is a developer of R (the statistical computing programming language and software environment). The overall loss computation is as follows:

---
Algorithm 6 Parallel Loss Computation
---
1: function Log1PExp(x)
2:     if x ≤ −37 then return exp(x)
3:     else if x ≤ 18 then return log 1p(exp(x))
4:     else if x ≤ 33.3 then return x + exp (−x)
5:     else return x
6:     end if ---
Algorithm 6 Parallel Loss Computation
---
7: end function
8: function LossComponentsGPU (l)
9:     for all ($p_A$, $i_A$; $p_N$, $i_N$; $i_P$) do in parallel
10:      if $p_A \neq p_N \wedge i_A \neq i_P$ then
11:        l($p_A$, $i_A$; $p_N$, $i_N$; $i_P$) ← LOG 1 PEXP(s($y_A$, $y_P$) − s($y_A$, $y_N$))
12:      else
13:        l($p_A$, $i_A$; $p_N$, $i_N$; $i_P$) ← 0
14:      end if
15:     end for
16: end function
17: function LossGPU
18:     l ← matrix($N_p N_i$; $N_p N_i$; $N_i$)
19:     LOSSCOMPONENTSGPU(l)
20:     return caffe_gpu_asum(l)
21: end function
---

The constants in the Log 1PExp function are intended for double-precision arithmetic. This function is useful at the beginning of optimization when the ŷ output vectors are disorganized and differences between squared distances can be large (because the network has not yet been well-trained).

3. Derivative Coefficients

The algorithm for computing parallel derivative coefficient components reuses the triplet matrix during backpropagation to compute the derivative coefficient components t, which were introduced above in Algorithm 3 (computing the derivative coefficients). This algorithm is as follows:

---
Algorithm 7 Parallel Derivative Coefficient Components
---
1: function DerivativeCoeffCompsForGPU(t)
2:     for all ($p_A$, $i_A$; $p_N$, $i_N$; $i_P$) do in parallel
3:      if $p_A \neq p_N \wedge i_A \neq i_P$ then
4:        t($p_A$, $i_A$; $p_N$, $i_N$; $i_P$) ← $1/\{(2\sigma^2) [1 + e^{(s(y_A, y_N) - s(y_A, y_P))}]\}$
5:      else
6:        t($p_A$, $i_A$; $p_N$, $i_N$; $i_P$) ← 0
7:      end if
9:     end for
10: end function
---

The derivative coefficient matrix c($p_1$, $i_1$; $p_2$, $i_2$) of some embodiments is a square matrix of size $N_p N_i$, the same as the first two dimensions of the triplet matrix. The sequential algorithm for computing c (Algorithm 3, shown above) performs four read-modify-write operations on c for each triplet. If attempting to run all iterations of this loop in parallel on the GPU, then multiple threads will attempt to read-modify-write the same entries in c at the same time. The GPU of some embodiments does not have the capability for implicit sequentialization of simultaneous atomic read-modify-writes, and in such embodiments the simultaneous writes could cause problems. However, the structure of the c matrix can be exploited to perform almost all of the computation in parallel.

First, it should be noted that c is a symmetric matrix, and lines 11 and 14 of Algorithm 3 write to symmetric matrix entries as do lines 12 and 13. Only the first write of each pair needs to be done in the parallel loop over all triplets. The symmetric writes can be performed later as a group by computing c+=$c^T$ in some embodiments.

Figure 6:
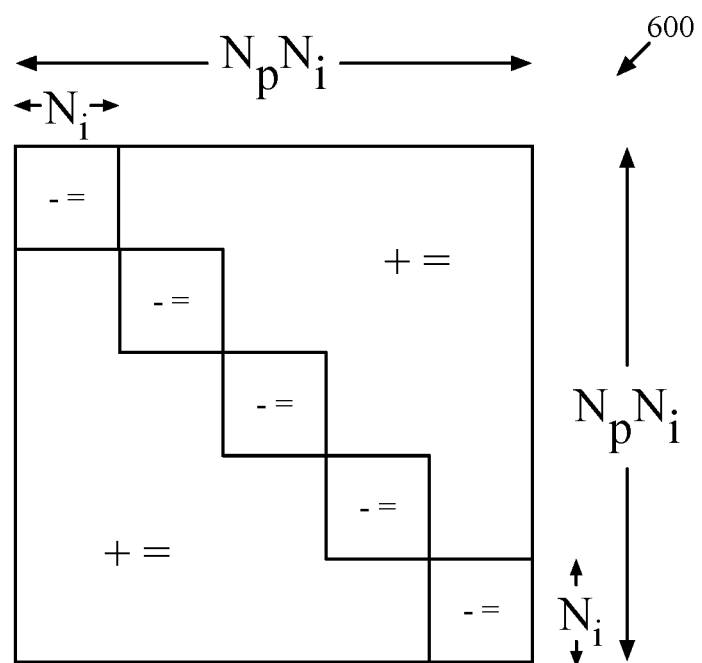
FIG. 6 illustrates a derivative coefficient matrix c as a block matrix with $N_p$ rows and $N_p$ columns of $N_i \times N_i$ blocks.

Second, the incrementing writes only modify matrix entries where $p_A \neq p_N$. The decrementing writes only modify matrix entries where the row and column are both $p_A$. FIG. 6 represents the derivative coefficient matrix c as a block matrix 600 with $N_p$ rows and $N_p$ columns of $N_i \times N_i$ blocks.

The decrementing writes are exclusive to the diagonal blocks and the incrementing writes are exclusive to the off-diagonal blocks.

The total set of increments applied to a given location in c by algorithm 3 line 11 Can be refactored as a reduction sum over the $i_p$ dimension of t:

$$c(p_A, i_A; p_N, i_N) \Sigma_{i_p} t(p_A, i_A; p_N, i_N; i_P) \qquad (X)$$

Likewise, the total set of decrements applied to a given location in c by line 12 of Algorithm 3 is a reduction sum over the $(p_N, i_N)$ dimension of t:

$$c(p_A, i_A; p_A; i_P) = \Sigma_{(p_N, i_N)} - t(p_A, i_A; p_N, i_N; i_P) \qquad (Y)$$

These observations show that c can be computed with two matrix multiplications to get the incrementing and decrementing reduction sums, followed by a matrix addition ($c + = c^T$) to complete the symmetric writes.

Equation (Z), below, demonstrates how some embodiments perform a reduction sum using matrix multiplication. This example shows a 2-D matrix reduced to a 1-D matrix by summing over the columns dimension. Similar arrangements allow for reduction sums to be performed over arbitrary axes of higher-dimensional matrices.

$$\begin{bmatrix} x_{11} & x_{12} & \ldots & x_{1n} \\ x_{21} & x_{22} & \ldots & x_{2n} \\ \vdots & \vdots & \ddots & \vdots \\ x_{m1} & x_{m2} & \ldots & x_{mn} \end{bmatrix} \cdot \begin{bmatrix} 1 \\ 1 \\ \vdots \\ 1 \end{bmatrix}_n = \begin{bmatrix} x_{11} + x_{12} + \ldots + x_{1n} \\ x_{21} + x_{22} + \ldots + x_{2n} \\ \vdots \\ x_{m1} + x_{m2} + \ldots + x_{mn} \end{bmatrix} \qquad (Z)$$

Figure 7:
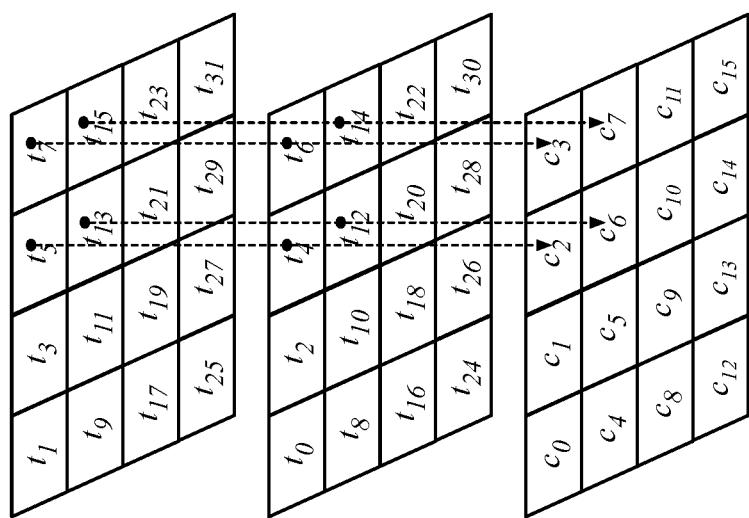
FIG. 7 illustrates computation of the upper-right sub-block of c, with each entry being the positive sum over the vertical axis of the t matrix

Some embodiments use Cublas (a library of GPU-accelerated basic linear algebra functions), which provides a batched matrix multiply function that is well-suited for restricting reduction sums to specific sub-blocks of c while still computing all sub-blocks in parallel with Near-perfect scaling on the GPU. A simple example is a batch of two categories, with two images per category. The t matrix has dimensions 4×4×2 and the c matrix is 4×4. First, the upper-right sub-block of c is computed, with each entry being the positive sum over the vertical axis of the t matrix as shown in FIG. 7, which illustrates one batch of the reduction sum over the $i_p$ axis. The subscripts in FIG. 7 refer to the order that the matrix entries are stored in memory.

The Cublas algorithm works on two-dimensional matrices, so first the final two dimensions of t are flattened to get a 4×8 matrix. Equation (AA) shows the upper-right hand 2×4 block of flattened t multiplied by a constant 4×2 matrix to get a 2×2 result that includes the desired sums. The result is written into the upper-right hand block of c. The "leading dimension" parameters are then passed to the Cublas function to indicate that the input and output matrices are sub-blocks of larger matrices stored in memory. The value is the width of the entire matrix, or the number of memory locations between elements in adjacent rows.

$$\underbrace{\begin{bmatrix} t_4 & t_5 & t_6 & t_7 \\ t_{12} & t_{13} & t_{14} & t_{15} \end{bmatrix}}_{lda=8} \qquad (AA)$$

$$\underbrace{\begin{bmatrix} 1 & 0 \\ 1 & 0 \\ 0 & 1 \\ 0 & 1 \end{bmatrix}}_{ldb=2} = \begin{bmatrix} t_4 + t_5 & t_6 + t_7 \\ t_{12} + t_{13} & t_{14} + t_{15} \end{bmatrix} \rightarrow \underbrace{\begin{bmatrix} c_2 & c_3 \\ c_6 & c_7 \end{bmatrix}}_{ldc=4}$$

Equation (BB) provides an isomorphic construction for the lower-left sub-block of c. Both of these matrix multiplies can be done in parallel on the GPU using a batched matrix multiply function in some embodiments, which takes arrays of pointers for the A, B, and C matrices. Algorithm 8, which follows, shows the key arguments.

$$\underbrace{\begin{bmatrix} t_{16} & t_{17} & t_{18} & t_{19} \\ t_{24} & t_{25} & t_{26} & t_{27} \end{bmatrix}}_{lda=8} \qquad (BB)$$

$$\underbrace{\begin{bmatrix} 1 & 0 \\ 1 & 0 \\ 0 & 1 \\ 0 & 1 \end{bmatrix}}_{ldb=2} = \begin{bmatrix} t_{16} + t_{17} & t_{18} + t_{19} \\ t_{24} + t_{25} & t_{26} + t_{27} \end{bmatrix} \rightarrow \underbrace{\begin{bmatrix} c_8 & c_9 \\ c_{12} & c_{13} \end{bmatrix}}_{ldc=4}$$

Algorithm 8 Computing the "Incrementing" Derivative Coefficients

Figure 8:
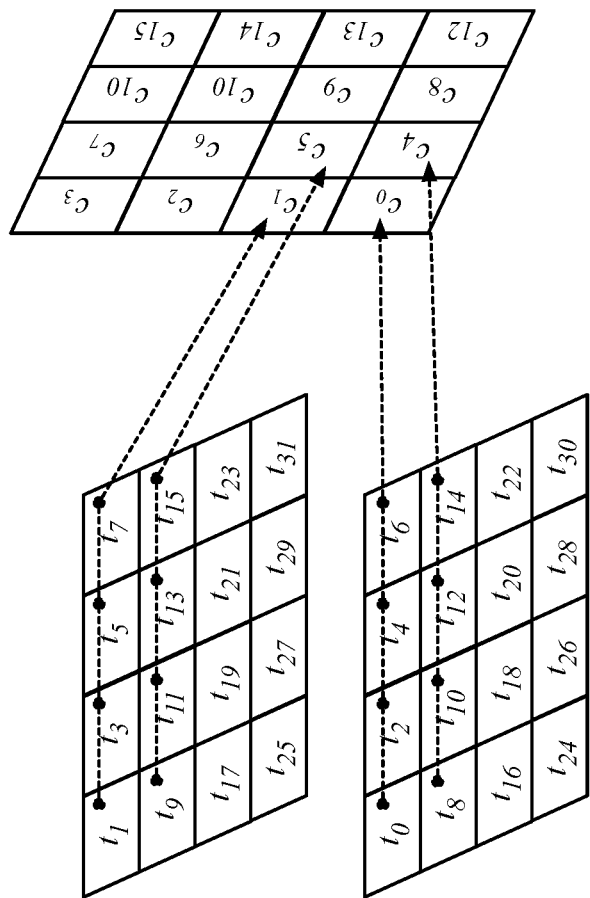
FIG. 8 illustrates a reduction sum over the $(p_N, i_N)$ axis of t for the first diagonal sub-block.

1:     function IncDerivCoefsGPU
2:         CUBLAS★GEMMBATCHED(m = 2, n = 2, k = 4,
            B = [b, b], ldb = 2,
            β = 0, C = [c + 2, c + 8], ldc = 4,
            batchCount = 2)
3:     end function The diagonal sub-blocks of c are computed in a similar way in some embodiments. FIG. 8 illustrates the required reduction sum over the $(p_N, i_N)$ axis of t for the first diagonal sub-block, and Equation (CC) shows the corresponding matrix multiplication using flattened t. The remaining diagonal sub-block(s) are isomorphic, and can all be computed in parallel using another batched matrix multiply, shown in Equation (DD):

$$-1 \cdot \underbrace{\begin{bmatrix} t_0 & t_1 & t_2 & t_3 & t_4 & t_5 & t_6 & t_7 \\ t_8 & t_9 & t_{10} & t_{11} & t_{12} & t_{13} & t_{14} & t_{15} \end{bmatrix}}_{lda=8} \qquad (CC)$$

$$\underbrace{\begin{bmatrix} 1 & 0 \\ 0 & 1 \\ 1 & 0 \\ 0 & 1 \\ 1 & 0 \\ 0 & 1 \\ 1 & 0 \\ 0 & 1 \end{bmatrix}}_{ldb=2} = \begin{bmatrix} -t_0 & -t_2 & -t_4 & -t_6 & -t_1 & -t_3 & -t_5 & -t_7 \\ -t_8 & -t_{10} & -t_{12} & -t_{14} & -t_9 & -t_{11} & -t_{13} & -t_{15} \end{bmatrix} \rightarrow$$

$$\underbrace{\begin{bmatrix} c_0 & c_1 \\ c_4 & c_5 \end{bmatrix}}_{ldc=4}$$

$$-1 \cdot \underbrace{\begin{bmatrix} t_{16} & t_{17} & t_{18} & t_{19} & t_{20} & t_{21} & t_{22} & t_{23} \\ t_{24} & t_{25} & t_{26} & t_{27} & t_{28} & t_{29} & t_{30} & t_{31} \end{bmatrix}}_{lda=8} \qquad (DD)$$

$$\begin{bmatrix} 1 & 0 \\ 0 & 1 \\ 1 & 0 \\ 0 & 1 \\ 1 & 0 \\ 0 & 1 \\ 1 & 0 \\ 0 & 1 \end{bmatrix}_{ldb=2} = \begin{bmatrix} -t_{16} & -t_{18} & -t_{20} & -t_{22} & -t_{17} & -t_{19} & -t_{21} & -t_{23} \\ -t_{24} & -t_{26} & -t_{28} & -t_{30} & -t_{25} & -t_{27} & -t_{29} & -t_{31} \end{bmatrix} \rightarrow$$

$$\begin{bmatrix} c_{10} & c_{11} \\ c_{14} & c_{15} \end{bmatrix}_{ldc=4}$$

For simplicity, the reduction sum over the entire $(p_N, i_N)$ dimension, including $p_N=_A$, is computed. The t matrix of some embodiments has zeros for the elements where $p_N p_A$, so this simplification does not change the result.

Also, for simplicity, the diagonal elements of the diagonal sub-blocks of c are computed even though these elements are untouched by Algorithm 3 due to the condition $i_A \neq i_p$. Again, the t matrix has zeros where $i_A - i_p$, so the diagonal elements of c are assigned to zero. This side effect makes it unnecessary to explicitly pre-initialize c.

It is possible to dispatch the CUBLAS*GEMMBATCHED calls in Algorithms 8 (above) and 9 (shown below) to the GPU in parallel using separate Cublas streams, in some embodiments. In this case, all elements of c can be computed in parallel. In some embodiments, it is more efficient to use a GEMV call to compute the reduction sum over the $i_p$ axis instead of GEMMBATCHED, although GEMV computes unnecessary zeros for the diagonal sub-blocks of c. Some embodiments use GEMV for the incrementing reduction sum sequentially before using GEMMBATCHED for the decrementing reduction sum.

---

Algorithm 9 Computing the "Decrementing" Derivative Coefficients

---

1:  function DECDERIVCOEFSGPU
2:      CUBLAS★GEMMBATCHED(m = $N_i$, n = $N_i$, k = $N_p N_i^2$,
        α = −1, A = [t + 0,t + 16, . . . ], lda = $N_p N_i^2$,
        B = [b,b, . . . ], ldb = $N_i$
        β = 0, C = [c + 0, c + 10, . . . ], ldc = $N_p N_i$,
        batchCount = $N_p$)
3:  end function

---

4. Derivative Computation

The final step of the backpropagation of some embodiments is to use the c matrix to compute the ∂l/∂y derivatives, as shown in the following algorithm:

---

Algorithm 10 Parallel Derivatives

---

1:  function LOSSDERIVATIVESGPU
2:      for all ($p_1$, $i_1$, d) do in parallel
3:          ∂l/∂y($p_1$, $i_1$, d) ← $\Sigma_{(p2,i2)}$ c($p_1$, $i_1$; $p_2$, $i_2$)[y($p_2$, $i_2$, d) − y($p_1$, $i_1$, d)]
4:      end for
5:  end function

---

IV. Device with Machine-Trained Network

Figure 9:
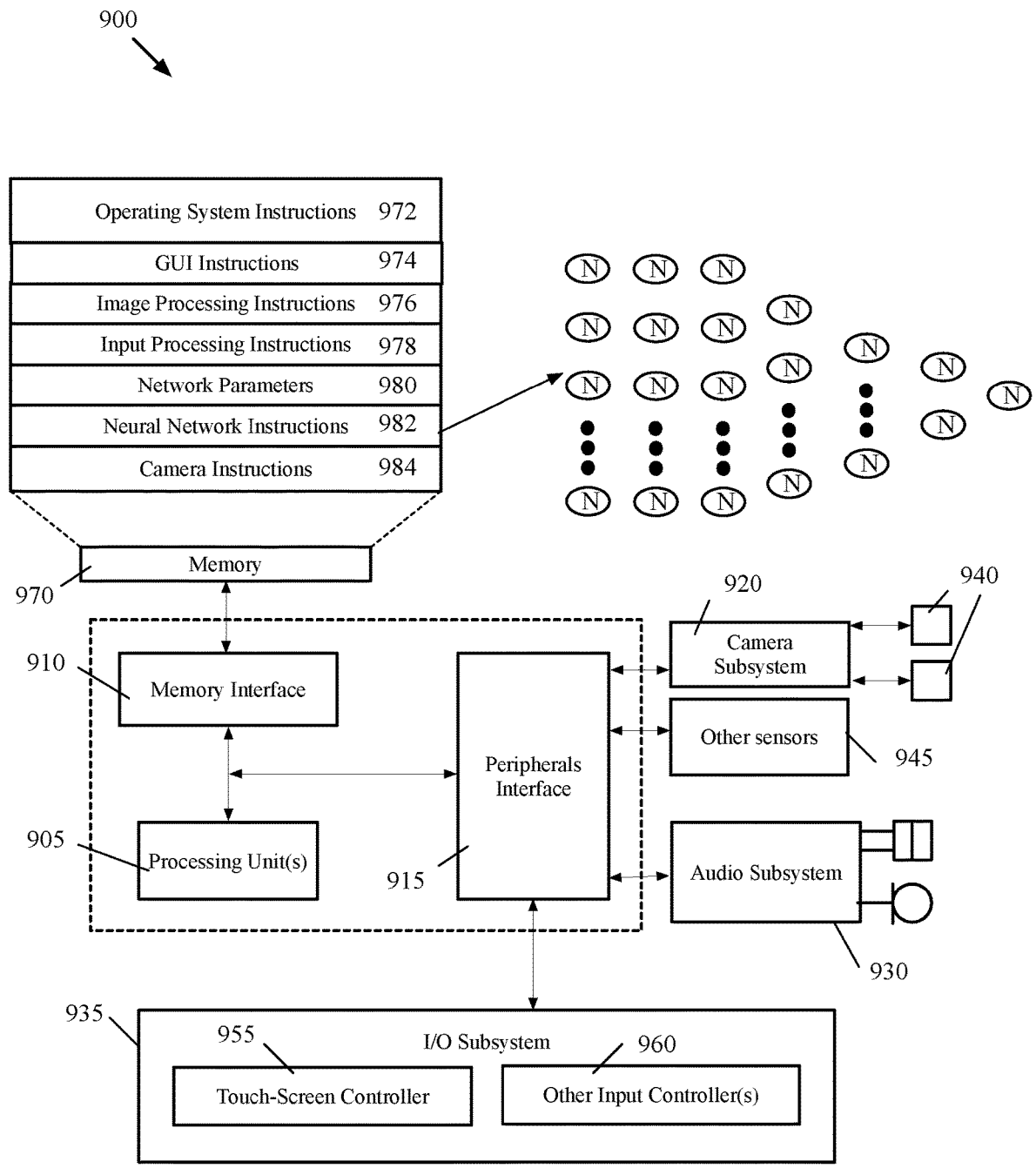
FIG. 9 illustrates an example of the architecture of a mobile computing device that stores neural network processing instructions.

Once an image analysis network (e.g., for face recognition, object categorization, etc.) is trained, the network can be embedded into devices (e.g., to perform face identification, etc.) such as mobile devices, desktop computers, Internet of Things (IoT devices), etc. FIG. 9 is an example of an architecture 900 of a mobile computing device that stores neural network processing instructions, with at least one set of weight parameters for the network. Examples of mobile computing devices include smartphones, tablets, laptops, etc. As shown, the mobile computing device 900 includes one or more processing units 905, a memory interface 910 and a peripherals interface 915. While a mobile device is shown in this example, many of these principles apply to other types of devices that use neural networks. An IOT device, for instance, might have fewer subsystems and fewer types of stored instructions, to perform its specific purpose and have the ability to receive a single type of input that is evaluated with its neural network.

The peripherals interface 915 is coupled to various sensors and subsystems, including a camera subsystem 920, an audio subsystem 930, an I/O subsystem 935, and other sensors 945 (e.g., motion sensors), etc. The peripherals interface 915 enables communication between the processing units 905 and various peripherals. For example, an orientation sensor (e.g., a gyroscope) and an acceleration sensor (e.g., an accelerometer) can be coupled to the peripherals interface 915 to facilitate orientation and acceleration functions. The camera subsystem 920 is coupled to one or more optical sensors 940 (e.g., a charged coupled device (CCD) optical sensor, a complementary metal-oxide-semiconductor (CMOS) optical sensor, etc.). The camera subsystem 920 and the optical sensors 940 facilitate camera functions, such as image and/or video data capturing.

The audio subsystem 930 couples with a speaker to output audio (e.g., to output voice navigation instructions). Additionally, the audio subsystem 930 is coupled to a microphone to facilitate voice-enabled functions, such as voice recognition (e.g., for searching), digital recording, etc. The I/O subsystem 935 involves the transfer between input/output peripheral devices, such as a display, a touch screen, etc., and the data bus of the processing units 905 through the peripherals interface 915. The I/O subsystem 935 includes a touch-screen controller 955 and other input controllers 960 to facilitate the transfer between input/output peripheral devices and the data bus of the processing units 905. The touch-screen controller couples with a touch screen (not shown) to detect contact and movement on the touch screen using any of multiple touch sensitivity technologies. The other input controllers 960 are coupled to other input/control devices, such as one or more buttons.

In some embodiments, the device includes wireless communication subsystem (not shown in FIG. 9) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 910 is coupled to memory 970. As illustrated in FIG. 9, the memory 970 stores an operating system (OS) 972. The OS 972 includes instructions for handling basic system services and for performing hardware dependent tasks. The memory 970 also stores various sets of instructions, including (1) graphical user interface instructions 974 to facilitate graphic user interface processing; (2) image processing instructions 976 to facilitate image-related processing and functions; (3) input processing instructions 978 to facilitate input-related (e.g., touch input) processes and functions; and (4) camera instructions 984 to facilitate camera-related processes and functions. The processing units 910 execute the instructions stored in the memory 970 in some embodiments.

In addition, the memory 970 stores neural network instructions 982, for implementing a machine-trained network of some embodiments of the invention. The memory also stores at least one set of network parameters 980 (i.e., weight values for enabling the network to perform a specific purpose). These network parameters 980 may include multiple sets of weight values in some embodiments (e.g., a set of weight values for an audio-processing network and a set of weight values for an image-processing network). These sets of weights are used by the processing units 910 when executing the neural network instructions 982 to perform a specific purpose (e.g., audio processing, image processing, face recognition, etc.).

The memory 970 further stores communication instructions to facilitate communicating with one or more additional devices. The instructions described above are merely exemplary and the memory 970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

The memory 970 may represent multiple different storages available on the device 900. In some embodiments, the memory 970 includes volatile memory (e.g., high-speed random access memory), non-volatile memory (e.g., flash memory), a combination of volatile and non-volatile memory, and/or any other type of memory. In some embodiments, the memory 970 includes processor registers, multiple levels of processor caches (e.g., the L0 micro-operations cache, L1 instruction cache, L1 data cache, etc.), main memory (e.g., RAM), disk storage, etc. In some embodiments, when possible, one or more sets of weight parameters 980 are stored in one of the levels of processor caches, so that the data is quickly accessible and does not need to be loaded onto the processor to evaluate an input.

While the components illustrated in FIG. 9 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 9 may be split into two or more integrated circuits.

V. Electronic System

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
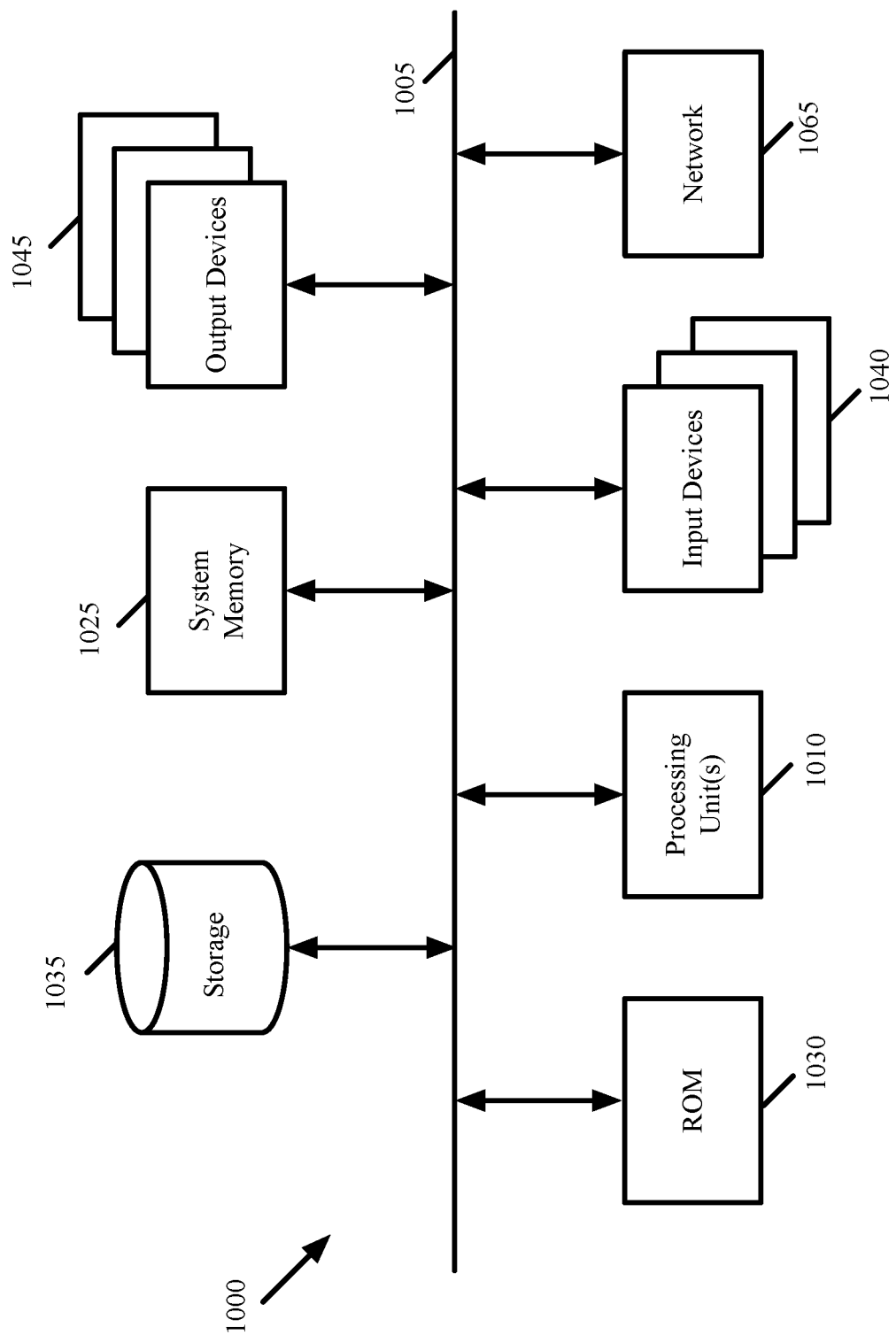
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIG. 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for training a machine-trained (MT) network that classifies inputs into a plurality of categories, the method comprising:

propagating a plurality of input training items through the MT network to generate a respective output value for each respective input training item, the plurality of input training items comprising input training items for each of the categories;

identifying a plurality of triplets from the plurality of input training items, wherein each respective triplet comprises two input training items in a respective first category and one input training item in a respective second category, wherein a plurality of the input training items belong to at least two different triplets;

calculating a value of a loss function as a summation of respective individual loss functions for each of the respective identified triplets, the respective individual loss function for each respective triplet based on the output values generated for the input training items of the triplet; and training the MT network using the calculated loss function value.

2. The method of claim 1, wherein the input items are images and the categories comprise different types of objects found in the images.

3. The method of claim 1, wherein:

the input items are images and the categories comprise a plurality of different people, wherein each input training item for a particular person comprises a different image of the particular person's face; and the machine-trained network is for embedding into a device to perform facial recognition.

4. The method of claim 1, wherein:

the set of input images comprises $N_i$ images for each of $N_p$ categories; and a number of identified triplets is of the order $(N_i)^3*(N_p)^2$.

5. The method of claim 1, wherein:

each output value is a vector; and the respective individual loss function for each respective triplet is a function of the proximity of the vectors for one of the input training items in the first respective category and the input training item in the respective second category to the vector for the other input training item in the first respective category.

6. The method of claim 1, wherein:

each output value is a vector; and the respective individual loss function for each respective triplet is a function of the probability of a misclassification of one of the input training items in the respective first category based on the vector of the three input training items of the triplet.

7. The method of claim 1, wherein:

the MT network comprises input nodes, output nodes, and interior nodes between the input nodes and output nodes;

each node produces a node output value and each interior node and output node receives as node input values a set of node output values of other nodes and applies weights to each received input value; and training the MT network comprises training the weights.

8. The method of claim 1, wherein the propagating, identifying, calculating, and training are performed iteratively.

9. The method of claim 1, wherein training the MT network comprises:

backpropagating the calculated loss function value through the MT network to determine, for each of a set of network parameters, a rate of change in the calculated loss function value relative to a rate of change in the network parameter; and modifying each network parameter in the set according to the determined rate of change for the network parameter.

10. The method of claim 1, wherein identifying the plurality of triplets comprises identifying each possible triplet formed by the plurality of input training items.

11. A non-transitory machine-readable medium storing a program which when executed by at least one processing unit trains a machine-trained (MT) network that classifies inputs into a plurality of categories, the program comprising sets of instructions for:

propagating a plurality of input training items through the MT network to generate a respective output value for each respective input training item, the plurality of input training items comprising input training items for each of the categories;

identifying a plurality of triplets from the plurality of input training items, wherein each respective triplet comprises two input training items in a respective first category and one input training item in a respective second category, wherein a plurality of the input training items belong to at least two different triplets;

calculating a value of a loss function as a summation of respective individual loss functions for each of the respective identified triplets, the respective individual loss function for each respective triplet based on the output values generated for the input training items of the triplet; and training the MT network using the calculated loss function value.

12. The non-transitory machine-readable medium of claim 11, wherein the input items are images and the categories comprise different types of objects found in the images.

13. The non-transitory machine-readable medium of claim 11, wherein:

the input items are images and the categories comprise a plurality of different people, wherein each input training item for a particular person comprises a different image of the particular person's face; and the machine-trained network is for embedding into a device to perform facial recognition.

14. The non-transitory machine-readable medium of claim 11, wherein:

the set of input images comprises $N_i$ images for each of $N_p$ categories; and a number of identified triplets is of the order $(N_i)^3 * (N_p)^3$.

15. The non-transitory machine-readable medium of claim 11, wherein:

each output value is a vector; and the respective individual loss function for each respective triplet is a function of the proximity of the vectors for one of the input training items in the first respective category and the input training item in the respective second category to the vector for the other input training item in the first respective category.

16. The non-transitory machine-readable medium of claim 11, wherein:

each output value is a vector; and the respective individual loss function for each respective triplet is a function of the probability of a misclassification of one of the input training items in the respective first category based on the vector of the three input training items of the triplet.

17. The non-transitory machine-readable medium of claim 11, wherein:

the MT network comprises input nodes, output nodes, and interior nodes between the input nodes and output nodes;

each node produces a node output value and each interior node and output node receives as node input values a set of node output values of other nodes and applies weights to each received input value; and the set of instructions for training the MT network comprises a set of instructions for training the weights.

18. The non-transitory machine-readable medium of claim 11, wherein the propagating, identifying, calculating, and training are performed iteratively.

19. The non-transitory machine-readable medium of claim 11, wherein the set of instructions for training the MT network comprises sets of instructions for:

backpropagating the calculated loss function value through the MT network to determine, for each of a set of network parameters, a rate of change in the calculated loss function value relative to a rate of change in the network parameter; and modifying each network parameter in the set according to the determined rate of change for the network parameter.

20. The non-transitory machine-readable medium of claim 11, wherein the set of instructions for identifying the plurality of triplets comprises a set of instructions for identifying each possible triplet formed by the plurality of input training items.

* * * * *